US011395186B2

United States Patent
Chennichetty et al.

(10) Patent No.: US 11,395,186 B2
(45) Date of Patent: Jul. 19, 2022

(54) PROFILE-BASED CLIENT STEERING IN MULTIPLE ACCESS POINT (AP) NETWORKS

(71) Applicant: QUALCOMM Incorporated, San Diego, CA (US)

(72) Inventors: Prakash Chennichetty, Chennai (IN); Yashwanth Jayaprakash, Chennai (IN); Thanigaivel Nagendran, Chennai (IN); Subramanian Anantharaman, Chennai (IN)

(73) Assignee: QUALCOMM Incorporated, San Diego, CA (US)

( * ) Notice: Subject to any disclaimer, the term of this patent is extended or adjusted under 35 U.S.C. 154(b) by 78 days.

(21) Appl. No.: 17/028,120

(22) Filed: Sep. 22, 2020

(65) Prior Publication Data

US 2021/0120454 A1 Apr. 22, 2021

(30) Foreign Application Priority Data

Oct. 17, 2019 (IN) .............................. 201941042053

(51) Int. Cl.
*H04W 28/10* (2009.01)
*H04L 1/00* (2006.01)
(Continued)

(52) U.S. Cl.
CPC .......... *H04W 28/10* (2013.01); *H04B 7/0452* (2013.01); *H04L 1/0004* (2013.01);
(Continued)

(58) Field of Classification Search
CPC ... H04L 5/0007; H04L 1/0001; H04L 1/0033; H04L 1/0004; H04L 27/2601; H04W 28/08; H04W 84/18; H04W 28/10; H04W 84/12; H04W 36/0009; H04W 36/30; H04W 36/14; H04W 36/26; H04B 7/024; H04B 7/0452

See application file for complete search history.

(56) References Cited

U.S. PATENT DOCUMENTS

2006/0030323 A1* 2/2006 Ode ...................... H04W 36/30
455/438
2009/0163223 A1* 6/2009 Casey ................... H04W 36/22
455/453

(Continued)

OTHER PUBLICATIONS

International Search Report and Written Opinion—PCT/US2020/053225—ISA/EPO—dated Dec. 17, 2020.

*Primary Examiner* — Jung Liu
(74) *Attorney, Agent, or Firm* — Qualcomm Incorporated

(57) ABSTRACT

This disclosure provides systems, methods and apparatuses, including computer programs encoded on computer-readable media, for steering a wireless device (such as a client station (STA)) in a network having multiple access points (APs). In some aspects, a processor at a first AP may monitor a traffic flow associated with the wireless device. The processor may determine that the wireless device is to be steered, based, at least in part, on the monitored traffic flow. The processor may generate a steering ranking list based on the profile of the wireless device. And the processor may selectively steer the wireless device to a different wireless association in the multi-AP network based on the steering ranking list.

30 Claims, 8 Drawing Sheets

(51) Int. Cl.
*H04W 84/18* (2009.01)
*H04B 7/0452* (2017.01)
*H04W 84/12* (2009.01)
*H04L 5/00* (2006.01)

(52) U.S. Cl.
CPC .......... *H04L 1/0033* (2013.01); *H04L 5/0007* (2013.01); *H04W 84/12* (2013.01); *H04W 84/18* (2013.01)

(56) References Cited

U.S. PATENT DOCUMENTS

| | | | | |
|---|---|---|---|---|
| 2014/0112306 | A1* | 4/2014 | Zhou | H04W 36/0022 370/331 |
| 2014/0370895 | A1* | 12/2014 | Pandey | H04W 28/08 455/436 |
| 2015/0111575 | A1* | 4/2015 | Lei | H04W 28/0226 455/436 |
| 2015/0222546 | A1* | 8/2015 | Van Phan | H04L 47/783 709/226 |
| 2016/0014648 | A1* | 1/2016 | Hamilton | H04W 36/0061 455/436 |

* cited by examiner

| Category 420 | Subcategory 440 | Weight 450 |
|---|---|---|
| WMM Access Categories 421 | AC_VO | 4 |
| | AC_VI | 3 |
| | AC_BE | 2 |
| | AC_BK | 1 |
| Number of Spatial Streams 422 | 4 | 4 |
| | 3 | 3 |
| | 2 | 2 |
| | 1 | 1 |
| HT modes 423 | HT160/HT80+80 | 4 |
| | HT80 | 3 |
| | HT40 | 2 |
| | HT20 | 1 |
| WiFi Radio Capability 424 | 11ax | 4 |
| | 11ac | 3 |
| | 11n | 2 |
| | 11a/b/g | 1 |
| MCS Transmission Rate 425 | MCS9 | 4 |
| | MCS7-8 | 3 |
| | MCS4-6 | 2 |
| | <MCS4 | 1 |
| Data Rate Client is Currently Being Served 426 | <10 Mbps | 8 |
| | 10-50 Mbps | 4 |
| | >50 Mbps | 2 |
| MU-MIMO Compatibility? 427 | Yes | 10 |
| | No | 5 |
| OFDM/OFDMA Compatibility? 428 | Yes | 10 |
| | No | 5 |
| Moving Client? 429 | Yes | 4 |
| | No | 2 |
| Hop Count of Connected AP 430 | 0 | 4 |
| | 1 | 3 |
| | 2 | 2 |
| | >2 | 1 |
| Service Based Classification 431 | Mobile Phones / Tablets | 10 |
| | Laptops | 8 |
| | Embedded Clients | 6 |
| | IOT Clients | 4 |
| | Desktops | 2 |
| High Priority Clients 432 | Medical Equipment | 20 |
| | Emergency Services | 15 |
| | Security | 10 |
| Steering Failure Penalty 433 | For Every Failed Attempt | -2 |

*Figure 4*

PROFILE-BASED CLIENT STEERING IN MULTIPLE ACCESS POINT (AP) NETWORKS

PRIORITY

The present application for patent claims priority to Indian Provisional Application No. 201941042053 entitled "PROFILE-BASED CLIENT STEERING IN MULTIPLE ACCESS POINT (AP) NETWORKS" filed Oct. 17, 2019, and assigned to the assignee hereof and hereby expressly incorporated by reference herein.

TECHNICAL FIELD

This disclosure relates generally to the field of wireless networks, and more particularly, to steering wireless devices between different access points (AP) or different frequency bands in a multiple access point (multi-AP) environment.

DESCRIPTION OF THE RELATED TECHNOLOGY

A wireless local area network (WLAN) may be formed by one or more access points (APs) that provide a shared wireless medium for use by a number of client devices. Each AP, which may correspond to a Basic Service Set (BSS), periodically broadcasts beacon frames to enable compatible client devices within wireless range of the AP to establish and maintain a communication link with the WLAN. WLANs that operate in accordance with the IEEE 802.11 family of standards are commonly referred to as Wi-Fi networks, and client devices that communicate with APs in a Wi-Fi network may be referred to as wireless stations (STAs). APs and STAs are capable of operating on a number of different frequency bands including, for example, the 2.4 GHz frequency band, the 5 GHz frequency band, the 6 GHz frequency band, and the 60 GHz frequency band.

In some implementations, a plurality of APs may be connected together to form an extended BSS (ESS). For example, many office and home wireless networks configured to operate as an ESS may include a root AP and a number of satellite APs such as relay or repeater APs. The root AP may provide a back-haul connection to other networks (such as the Internet), and the repeater APs may extend the effective wireless coverage area of the root AP. In some other implementations, a plurality of APs may be configured to operate as a mesh network. In a mesh network, the APs may be directly connected to each other in a non-hierarchical manner that allows the APs to cooperate with each other to efficiently route data to and from STAs. Mesh networks can dynamically self-organize and self-configure, which may reduce installation overhead and allow for the dynamic load balancing in the network. Some mesh networks may be referred to as Self-Organizing Networks (SONs).

Typically, each STA is associated with a single AP, on a selected frequency band, at a time and relies upon its associated AP to receive data. In a multi-AP environment, the STA may be moved within the wireless network and may benefit by switching its association from the selected AP to one of a number of candidate APs (i.e., which may offer better service than the selected AP) or by switching to another frequency band. As more STAs join the wireless network, the overall load on each AP or frequency band may become imbalanced, which may undesirably result in a less than optimal allocation of the wireless network's capacity.

SUMMARY

The systems, methods and devices of this disclosure each have several innovative aspects, no single one of which is solely responsible for the desirable attributes disclosed herein.

One innovative aspect of the subject matter described in this disclosure can be implemented in a method of steering one or more wireless devices in a multi-AP environment. The method may include monitoring a traffic flow associated with the one or more wireless devices; determining that at least one wireless device of the one or more wireless devices is to be steered, based at least in part, on the monitored traffic flow; generating a steering ranking list of the one or more wireless devices based on a profile of each of the one or more wireless devices; and selectively steering the at least one wireless device to a different wireless association in the multi-AP environment based, at least in part, on the steering ranking list. In some implementations, the multi-AP environment is a self-organizing network (SON).

In some implementations, selectively steering the at least one wireless device occurs based on an order of the steering ranking list. In some implementations, generating the steering ranking list is based on assigning weights to the profile of each of the one or more wireless devices. In some implementations, the profile of each of the one or more wireless devices includes at least one member of the group consisting of: a Wi-Fi multimedia (WMM) access category (AC) designation; a number of spatial streams supported; a high throughput (HT) operation mode; a Wi-Fi radio capability; a modulation and coding scheme (MCS) transmission rate; a data rate of the monitored traffic flow; a multi-user (MU)-multiple input and multiple output (MIMO) compatibility; an orthogonal frequency-division multiplexing (OFDM)/orthogonal frequency-division multiple access (OFDMA) compatibility; a mobility designation; a hop count of a connected AP to a root AP; a service-based classification; a priority designation; and a steering success rate. In some implementations, the priority designation indicates a level of criticality. In some implementations, the priority designation is statically set in the profile. In some implementations, the steering success rate is based on historical attempts to steer each of the one or more wireless devices.

In some implementations, the steering ranking list is updated after each attempt to selectively steer the at least one wireless device to the different wireless association in the multi-AP environment. In some implementations, the steering ranking list is generated dynamically.

In some implementations, the different wireless association in the multi-AP environment includes: a different band of a first AP in which the at least one wireless device is associated with wirelessly; or a second AP. In some implementations, selectively steering the at least one wireless device to the second AP includes sending a steering message from the first AP to the second AP; and sending a steering request to the at least one wireless device, where the steering request instructs the at least one wireless device to join a basic service set (BSS) of the second AP. In some implementations, the steering message informs the second AP that the steering request instructs the at least one wireless device to join the BSS of the second AP.

In some implementations, the method includes determining if a steering bit is enabled in the profile of each of the one or more wireless devices.

Another innovative aspect of the subject matter described in this disclosure can be implemented in an apparatus of an access point (AP) for steering one or more wireless devices in a multi-access point (AP) environment. The apparatus includes a first interface configured to obtain one or more packets from the one or more wireless devices; and a processing system configured to: monitor a traffic flow associated with the one or more packets; determine that at least one wireless device of the one or more wireless devices is to be steered, based at least in part, on the monitored traffic flow; generate a steering ranking list of the one or more wireless devices based on a profile of each of the one or more wireless devices; and selectively steer the at least one wireless device to a different wireless association in the multi-AP environment based, at least in part, on the steering ranking list.

In some implementations, selectively steering the at least one wireless device occurs based on an order of the steering ranking list. In some implementations, the processing system is further configured to update the steering ranking list after each attempt to selectively steer the at least one wireless device to the different wireless association in the multi-AP environment.

In some implementations, generating the steering ranking list is based on assigning weights to the profile of each of the one or more wireless devices. In some implementations, the profile of each of the one or more wireless devices includes at least one member of the group consisting of: a Wi-Fi multimedia (WMM) access category (AC) designation; a number of spatial streams supported; a high throughput (HT) operation mode; a Wi-Fi radio capability; a modulation and coding scheme (MCS) transmission rate; a data rate of the monitored traffic flow; a multi-user (MU)-multiple input and multiple output (MIMO) compatibility; an orthogonal frequency-division multiplexing (OFDM)/orthogonal frequency-division multiple access (OFDMA) compatibility; a mobility designation; a hop count of a connected AP to a root AP; a service-based classification; a priority designation; and a steering success rate. In some implementations, the priority designation indicates a level of criticality. In some implementations, the steering success rate is based on one or more historical attempts to steer each of the one or more wireless devices in the multi-AP environment.

The apparatus of the AP can be implemented to perform any of the aspects of the innovative method described above.

Another innovative aspect of the subject matter described in this disclosure can be implemented in a computer-readable medium having instructions stored therein to cause a processor of an access point (AP), operating within a multi-AP environment, to monitor a traffic flow associated with one or more wireless devices; determine that at least one wireless device of the one or more wireless devices is to be steered, based at least in part, on the monitored traffic flow; generate a steering ranking list of the one or more wireless devices based on a profile of each of the one or more wireless devices; and selectively steer the at least one wireless device to a different wireless association in the multi-AP environment based, at least in part, on the steering ranking list.

In some implementations, the processor of the AP is further configured to determine if a steering bit is enabled in the profile of each of the one or more wireless devices.

In some implementation, selectively steering the at least one wireless device occurs based on an order of the steering ranking list.

In some implementations, the different wireless association in the multi-AP environment includes: a different band of the AP; or another AP.

Another innovative aspect of the subject matter described in this disclosure can be implemented in an apparatus of an access point (AP) in a multi-AP environment. The apparatus includes means for monitoring a traffic flow associated with one or more wireless devices; means for determining that at least one wireless device of the one or more wireless devices is to be steered, based at least in part, on the monitored traffic flow; means for generating a steering ranking list of the one or more wireless devices based on a profile of each of the one or more wireless devices; and means for selectively steering the at least one wireless device to a different wireless association in the multi-AP environment based, at least in part, on the steering ranking list.

In some implementations, generating the steering ranking list is based on assigning weights to the profile of each of the one or more wireless devices. In some implementations, the profile of each of the one or more wireless devices includes at least one member of the group consisting of: a Wi-Fi multimedia (WMM) access category (AC) designation; a number of spatial streams supported; a high throughput (HT) operation mode; a Wi-Fi radio capability; a modulation and coding scheme (MCS) transmission rate; a data rate of the monitored traffic flow; a multi-user (MU)-multiple input and multiple output (MIMO) compatibility; an orthogonal frequency-division multiplexing (OFDM)/orthogonal frequency-division multiple access (OFDMA) compatibility; a mobility designation; a hop count of a connected AP to a root AP; a service-based classification; a priority designation; and a steering success rate. In some implementations, the priority designation is statically set in the profile.

In some implementations, the apparatus includes means for updating the steering ranking list after each attempt to selectively steer the at least one wireless device to the different wireless association in the multi-AP environment.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 4 shows an example table of wireless device capability categories with assigned weights.

DETAILED DESCRIPTION

Figure 1A:
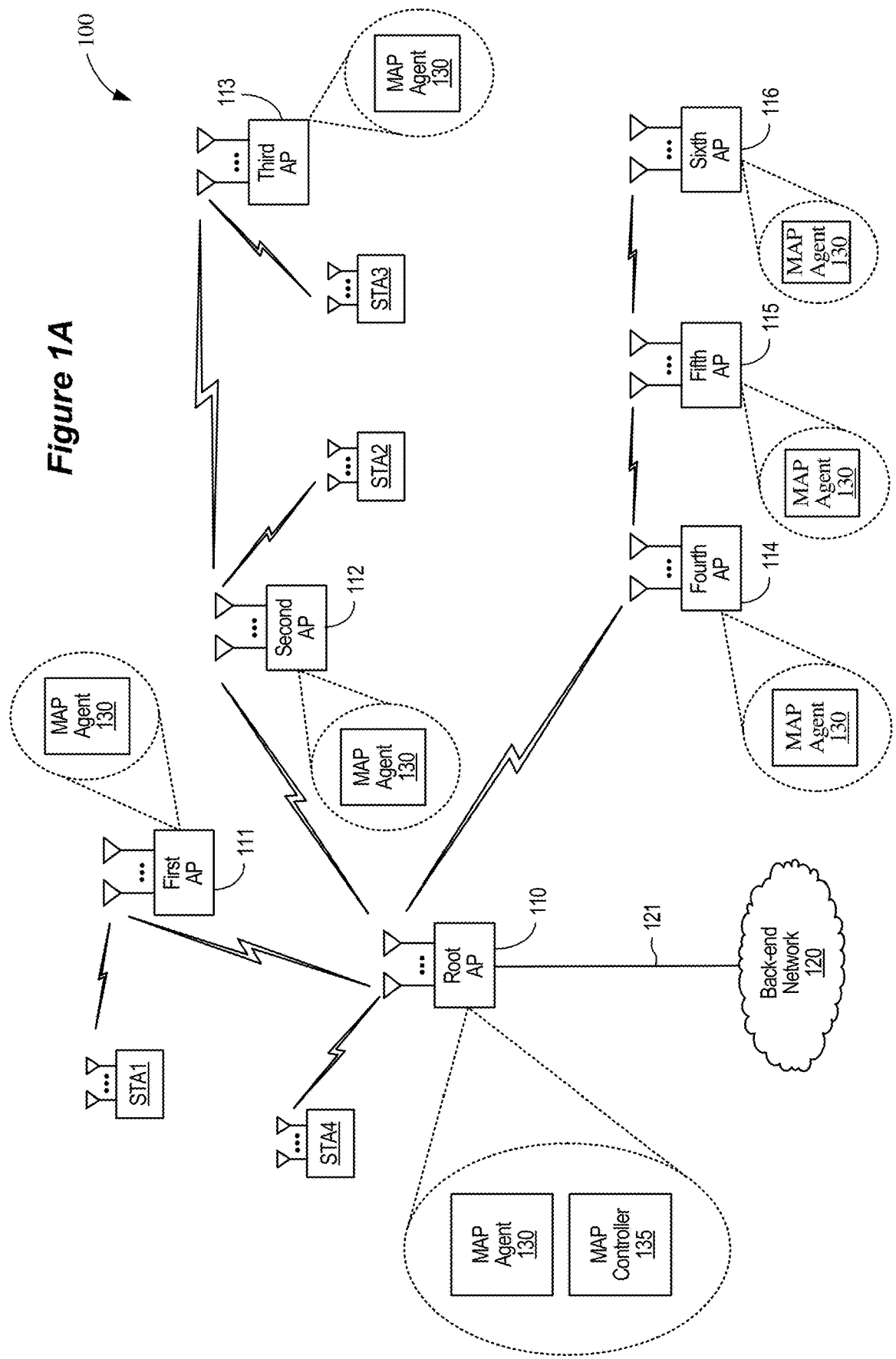
FIG. 1A shows an example multi-access point (AP) wireless network environment.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards (i.e., Wi-Fi), the IEEE 802.3 Ethernet standards, and the IEEE 1901 Powerline communication (PLC) standards. However, the described implementations may be implemented in any device, system or network that is capable of transmitting and receiving RF signals according to any of the wireless communication standards, including any of the IEEE 802.11 standards, the IEEE 802.15 Bluetooth® standards, Bluetooth low energy (BLE), code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G, 5G, or 6G, or further implementations thereof, technology.

In the following description, numerous specific details are set forth such as examples of specific components, circuits, and processes to provide a thorough understanding of the present disclosure. The term "coupled" as used herein means connected directly to or connected through one or more intervening components or circuits. The term "medium access" as used herein may refer to gaining and/or controlling access to a shared wireless medium. The term "transmit opportunity" (TXOP) as used herein may refer to a period of time during which a device (or a portion of the device) may transmit data via the shared wireless medium. The term "access category" refers to data that may be queued together or aggregated according to priority level. The priority level of packets or of a flow to which the packets belong may indicate an importance of such packets relative to packets belonging to other flows. For example, higher priority traffic may be given more frequent access to the shared wireless medium, longer access to the shared wireless medium, or a greater portion of the available bandwidth of the shared wireless medium than lower-priority traffic.

The term "associated access point (AP)" refers to an AP with which a given device (such as a client station (STA)) is associated (such as there is an established communication channel or link between the AP and the given STA). The term "non-associated AP" refers to an AP with which a given STA is not associated (such as there is not an established communication channel or link between the AP and the given STA, and thus the AP and the given STA may not yet exchange data frames). The non-associated APs also may be referred to herein as "candidate APs," and thus the terms "non-associated AP" and "candidate AP" may be used interchangeably herein.

The terms "goodput" and "throughput" may refer to an effective data rate of a wireless channel or link between two wireless devices (such as between a STA and an AP). The term "goodput" may be used interchangeably with the term "throughput" in the following description. For example, the goodput of an AP may be indicative of the available bandwidth of a wireless channel upon which the AP operates, and thus also may be indicative of the amount of traffic on the wireless channel.

The term "obstruction," as used herein, refers to any source of interference (such as physical objects or electromagnetic waves) that may inhibit or degrade wireless communications between a STA and an AP. In addition, although described herein in terms of exchanging data frames between wireless devices, the implementations may be applied to the exchange of any data unit, packet, or frame between wireless devices. Thus, the term "frame" may include any frame, packet, or data unit such as, for example, protocol data units (PDUs), MAC protocol data units (MPDUs), and physical layer convergence procedure protocol data units (PPDUs).

A local network in a home, apartment, business, or other area may include a variety of devices that utilize the local network to communicate with each other or with devices in another network. For example, the local network may provide access for local devices to communicate to an upstream network (such as access to the Internet, via a broadband network). The local network (or local area network (LAN), sometimes also referred to as a wireless local area network (WLAN)) may include one or more access points (APs) to provide wireless coverage for the local network. The one or more APs may communicate with one another in a multiple AP (or multi-AP) environment. Each AP in the network may have different hardware capabilities (such as 2.4 GHz support, 5 GHz support, dual-band single radio support, dual band dual concurrent radios (DBDC) support, or the like) that may provide different options for wireless coverage. Each AP utilizes one or more channels within a frequency band. A channel may refer to a frequency (or range) used by the AP to communicate with devices that have a wireless association with the AP. Similarly, the devices utilize the channel to communicate (via a wireless association) with the AP. In some implementations, an AP may be equipped with more than one radio and may be capable of operating on more than one channel (such as a DBDC device).

Typically, one of the APs in the multi-AP environment will be referred to as a root AP, or central AP, while other APs make automatic path or routing selection using a logical topology between each of the other APs and the root AP. A local network which is capable of coordinating between two or more APs to manage a topology or aggregate wireless coverage area may be referred to as a self-organizing network (SON). In such implementations, a SON protocol may be used between the two or more APs to coordinate wireless channel configurations or other implementation settings.

A device may select which AP (sometimes also referred to as a serving AP) to utilize from a plurality of APs in the multi-AP environment. The selection of the serving AP may be based on signal strengths of wireless signals or estimating, or measuring, the highest goodput received from each of the plurality of APs. In addition to, or alternatively from, selecting an AP, a device also may select a frequency band. For example, the device may select a 2.4 GHz or 5 GHz frequency band from the frequencies bands available for communication between the device and the plurality of APs. Typically, a device may select a first AP and frequency band of the first AP based on the information available to the device, however, the first AP (or a logical entity that implements logic for controlling the operation of a network having multiple APs, such as a Multi-AP Controller) may have access to more information regarding topology and performance of the APs in the network than is available to the device.

As such, the first AP may optimize the network or improve service for the device (such as a wireless device, or a station (STA)) by steering a device to a different AP (which would become the new serving AP for the device). Steering refers to any activity which causes the STA to wirelessly associate with a second AP instead of maintaining the association with a first AP. Steering also may be referred to as a re-association activity, move, transfer, relocate, transition, switch, re-position, handover, or the like. Steering does not necessarily involve physical or geographic movement of the STA. In a mesh network implementation, steering can involve seamlessly handing off a STA from one AP to another without changes in layer 7 connectivity (in other words, with steering, the IP address of the steered SA may not change).

There may be various reasons for steering the device. For example, the device may be steered to a different AP to perform load balancing in the network. In another example, because higher-frequency wireless signals typically have shorter range than lower-frequency wireless signals, a device that is moving away from a dual-band AP may obtain better throughput by switching from the 5 GHz frequency band to the 2.4 GHz frequency band. In yet another example, although higher-frequency wireless signals may have higher data rates than lower-frequency wireless signals, if the 5 GHz frequency band is congested, then the device may obtain better throughput by switching from the 5 GHz frequency band to the 2.4 GHz frequency band (i.e., assuming the 2.4 GHz frequency band is less congested than the 5 GHz frequency band). Other factors or conditions for steering a device may include backhaul performance, network topology, performance characteristics (such as throughput, goodput, bandwidth, latency, errors, jitter, and the like), locations of newly connected devices, intensity of communication between devices and an AP (such as bandwidth, bursting, types of traffic, and the like), assigned priorities of the devices, a change in quality of service (QoS), other performance requirements of the device, or a BSS capability of the AP may change.

The priority level of data transmitted (or to be transmitted) on a shared wireless medium also may be important in determining the "best available AP" (i.e., the AP that provides the highest, for example, goodput as compared with the goodput of other nearby APs) with which to associate. In addition, because data priority levels may be an important consideration when balancing traffic flows across a wireless network or when balancing the loads between multiple APs, data priority levels also may be important when steering STAs to a particular AP or to a particular frequency band. For example, because APs may transmit higher-priority data sooner, or more frequently, than lower-priority data, identifying the priority level of data, or traffic, flows associated with a particular STA may be useful not only for selecting the best available AP but also for maintaining balanced loads between multiple APs of the wireless network.

In some implementations, steering the wireless device may be based on a QoS profile. The QoS profile may be a capacity requirement (which also may be referred to as a traffic demand) or a delay requirement associated with a traffic flow of the device. In some implementations, the capacity requirement may represent a minimum amount of capacity (through a path to the root AP or gateway) that is needed to service the device. In some implementations, the delay requirement may represent a maximum amount of delay (through a path to the root AP or gateway) that is acceptable for the QoS profile. In this disclosure, a delay may be quantified as a time period or may be quantified as a hop count. A hop count refers to the number of links (between serving APs, intermediate APs, and the root AP) that are used in a path. A first path having a higher hop count may be considered as having a higher delay than a second path having a lower hop count.

Steering a device (or performing a topology change) may improve service to the device. To accommodate the QoS profile, a serving AP selection unit (in an AP of the network) may consider the topology of the network and performance information for various APs of the network. The topology and performance information can be used to estimate end-to-end path capacity and end-to-end path delay for each of a plurality of candidate paths. The selection of a target path may be based on the end-to-end path capacity or end-to-end path delay for the plurality of candidate paths. Depending on whether the traffic associated with the device is delay sensitive, the serving AP selection unit may use a capacity-focused selection technique or a delay-focused selection technique. Furthermore, and throughout this disclosure, operations of the serving AP, or serving AP selection unit, may be performed by a current serving AP, a child AP, a neighboring AP, a root AP, or a Multi-AP Controller.

In some implementations, steering the wireless device may be based on a profile of the wireless device (i.e., a wireless device profile). The wireless device profile may provide further granularity about each wireless device's capabilities and performance characteristics. By compiling each wireless device's capabilities and performance characteristics into a profile that can be provided to an AP, or generated by an AP, one or more APs in a multi-AP environment may be able to more effectively and efficiently serve data to each wireless device in the network. Each wireless device's capabilities and performance characteristics can be assigned "weights" or metrics, and the compilation, or consolidation, of these weights can be "ranked" (such as from first to last, etc.) in a steering ranking list. The steering ranking list can be utilized by the APs to prioritize steering efforts for each of the wireless devices in the network. For example, the wireless device having the highest ranking in the steering list may be prioritized for steering to another frequency band of the serving AP, or to another AP, or both. In some implementations, the wireless device profile may include a profile-based steering bit. In such implementations, if the profile-based steering bit is enabled, or set, in the wireless device profile, one or more of the APs in the multi-AP environment can mark the respective wireless device for steering according to the implementations described in this disclosure.

Particular implementations of the subject matter described in this disclosure can be implemented to realize one or more of the following potential advantages. By employing profile-based steering of wireless devices within a multi-AP environment, one or more APs may be configured to optimize the service needs of the wireless devices within the network. Additionally, optimizing steering within a multi-AP environment based on wireless device profiles may lead to higher throughput, higher goodput, and lower latencies in data transmission. Moreover, by steering wireless devices based on the device's capabilities and performance characteristics, instead of simply steering based on device type or operating system, may enable better load balancing in the multi-AP environment. Also, the ability to designate priority devices, and indicate a level of criticality of services required for those devices, such as medical-related service devices, may ensure such devices obtain high quality data services. Furthermore, by utilizing profile-based steering, the number of unnecessary steering attempts made for wireless devices unwilling to be steered may be reduced. As a corollary, user experience at the wireless devices may be improved.

FIG. 1A shows an example multi-access point (AP) wireless network 100 environment. The wireless network 100 is shown to include a number of wireless access points (APs) 110-116 and a number of wireless stations (STAs) STA1-STA4. The APs 110-116 may form a wireless local area network (WLAN) that allows the APs 110-116, the stations STA1-STA4, and other wireless communication devices (not shown for simplicity) to communicate with each other over a shared wireless medium. The shared wireless medium may be divided into a number of channels, may be divided into a number of resource units (RUs), or both. The APs 110-116 may each include an assigned unique MAC address that is programmed therein by, for example, the manufacturer of the access point. Similarly, each of the stations STA1-STA4 also may be assigned a unique MAC address. In some implementations, the wireless network 100 may correspond to a multiple-input multiple-output (MIMO) wireless network and may support single-user MIMO (SU-MIMO) and multi-user (MU-MIMO) communications. In some implementations, the wireless network 100 may support orthogonal frequency-division multiple access (OFDMA) communications.

In some implementations, access to the shared wireless medium is governed by a Distributed Coordination Function (DCF). With a DCF, there is no centralized master device allocating time and frequency resources of the shared wireless medium. On the contrary, before a wireless communication device, such as the APs 110-116 or the stations STA1-STA4, is permitted to transmit data, it must wait for a particular time and then contend for access to the wireless medium. In some implementations, the wireless communication device may be configured to implement the DCF through the use of Carrier Sense Multiple Access (CSMA) with Collision Avoidance (CA) (CSMA/CA) and timing intervals. Before transmitting data, the wireless communication device performs a Clear Channel Assessment (CCA) and determines that the appropriate wireless channel is idle. The CCA includes both physical (PHY-level) carrier sensing and virtual (MAC-level) carrier sensing. Physical carrier sensing is accomplished via a measurement of the received signal strength of a valid frame, which is then compared to a threshold to determine whether the channel is busy. If the received signal strength is above a threshold, the medium is considered busy. Physical carrier sensing also includes energy detection. Energy detection involves measuring the total energy the wireless communication device receives regardless of whether the received signal represents a valid frame. If the total energy detected is above a threshold, the medium is considered busy. Virtual carrier sensing is accomplished via the use of a Network Allocation Vector (NAV), an indicator of a time when the medium may next become idle. The NAV is reset each time a valid frame is received that is not addressed to the wireless communication device. The NAV effectively serves as a time duration that must elapse before the wireless communication device may contend for access even in the absence of a detected symbol or even if the detected energy is below the relevant threshold.

The DCF is implemented through the use of time intervals. These time intervals include the slot time (or slot interval) and the Inter-Frame Space (IFS). The slot time is the basic unit of timing and may be determined based on one or more of a transmit-receive turnaround time, a channel sensing time, a propagation delay and a MAC processing time. Measurements for channel sensing are performed for each slot. All transmissions may begin at slot boundaries. Different varieties of IFS exist including the short IFS (SIFS), the distributed IFS (DIFS), the extended IFS (EIFS), and the arbitration IFS (AIFS). For example, the DIFS may be defined as the sum of the SIFS and two times the slot time. The values for the slot time and IFS may be provided by a suitable standard specification, such as one of the IEEE 802.11 family of wireless communication protocol standards (such as that defined by the IEEE 802.11-2016 specification or amendments thereof including, but not limited to, 802.11n, 802.11ac, 802.11ah, 802.11ad, 802.11ay, 802.11ax, 802.11az, 802.11ba and 802.11be).

When the NAV reaches 0, the wireless communication device performs the physical carrier sensing. If the channel remains idle for the appropriate IFS (for example, the DIFS), the wireless communication device initiates a backoff timer, which represents a duration of time that the device must sense the medium to be idle before it is permitted to transmit. The backoff timer is decremented by one slot each time the medium is sensed to be idle during a corresponding slot interval. If the channel remains idle until the backoff timer expires, the wireless communication device becomes the holder of a Transmit Opportunity (TXOP) and may begin transmitting. The TXOP is the duration of time the wireless communication device can transmit frames over the channel after it has won contention for the wireless medium. If, on the other hand, one or more of the carrier sense mechanisms indicate that the channel is busy, a MAC controller within the wireless communication device will not permit transmission.

Each time the wireless communication devices generates a new physical layer convergence protocol (PLCP) protocol data unit (PPDU) for transmission in a new TXOP, it randomly selects a new backoff timer duration. The available distribution of the numbers that may be randomly selected for the backoff timer is referred to as the Contention Window (CW). If, when the backoff timer expires, the wireless communication device transmits the PPDU, but the medium is still busy, there may be a collision. Additionally, if there is otherwise too much energy on the wireless channel resulting in a poor signal-to-noise ratio (SNR), the communication may be corrupted or otherwise not successfully received. In such instances, the wireless communication device may not receive a communication acknowledging the transmitted PPDU within a timeout interval. The MAC may then increase the CW exponentially, for example, doubling it, and randomly select a new backoff timer duration from the CW before each attempted retransmission of the PPDU. Before each attempted retransmission, the wireless communication device may wait a duration of DIFS and, if the medium remains idle, then proceed to initiate the new backoff timer. There are different CW and TXOP durations for each of the four Access Categories (ACs): voice (AC_VO), video (AC_VI), background (AC_BK), and best effort (AC_BE). This enables particular types of traffic to be prioritized in the network.

The wireless network 100, or wireless communication network, in addition to an example of a WLAN, also can be an example of a wireless personal area network (PAN). In some implementations, the wireless network 100 can be implemented as an ad hoc, peer-to-peer (P2P), or mesh network. In some implementations, the wireless network 100 is a Wi-Fi network and defined by the IEEE 802.11 family of standards. In some other implementations, the wireless network 100 is an example of a Bluetooth® network and the stations STA1-STA4 are Bluetooth®-compliant devices. In some additional implementations, the wireless network 100 can include one or more of the following wireless communication technologies: Bluetooth Low Energy (BLE), BLE mesh, ZigBee, Low Power IoT, LTE or 5G. Furthermore, in some implementations, the wireless network 100 can be implemented as a hybrid network, and can support both wired and wireless communication technologies, multiple wired communication technologies, or multiple wireless communication technologies. For example, one or more of the APs 110-116 can support both IEEE 802.11 and powerline communication (PLC) protocols. In some other examples, the APs 110-116 can support a combination of IEEE 802.11 and PLC protocols, a combination of IEEE 802.11 and coaxial cable (Coax) based communication protocols, a combination of IEEE 802.11 and Ethernet based communication protocols, a combination of IEEE 802.11 and Bluetooth communication protocols, a combination of IEEE 802.11 and LTE communication protocols, a combination of IEEE 802.11 and 5G communication protocols, and various other suitable combinations.

The stations STA1-STA4 may be any suitable wireless communication electronic device. The wireless communication electronic devices also may be known as electronic devices. An electronic device also may be referred to as a user equipment (UE), a smartphone, a mobile device, wireless device, a wireless node, a receiver device, a remote device, a handheld device, or a subscriber device, or some other suitable terminology, where the "device" also may be referred to as a unit, a terminal, or a client. The electronic device may be implemented as any computing device configured to receive, process and otherwise handle information, including audio or visual or audio/visual (i.e., video), over a communications network. The electronic device also may be a cellular phone, a personal digital assistant (PDA), a laptop or laptop computer, a tablet device, a personal computer, a gaming console, a virtual or augmented reality device, a drone, an Internet of Things (IoT) device, or other electronic system. IoT devices also may be referred to as an Internet of Everything (IoE) device, an IoT hub, and IoE hub, or any other physical device, vehicle, or home appliance that is embedded with electronics and network connectivity, which enable these objects to connect and exchange data. The IoT device also may be referred to as a virtual assistant device, such as Amazon Alexa®, Google Home®, etc., a wearable device, such as smart watches, Google Glass®, etc., an in-vehicle entertainment or communication system, a home security system, or any device having an interface, such as a network interface, to a communications network and suitable input and output devices. Wearable devices also may be referred to as wearable technology, wearable gadgets, wearables, or some other suitable terminology, which generally describes electronics and software-based technology that is worn on the body, either as an accessory, or as part of material used in clothing. Additionally, the electronic device can be implemented as a display device (for example, TVs, computer monitors, navigation systems, among others), music or other audio or stereo devices (for example, audio headphones or ear buds), remote control devices (i.e., remotes), printers, copiers, kitchen or other household appliances, and key fobs (such as for passive keyless entry and start (PKES) systems).

The APs 110-116 may be any suitable device that allows one or more wireless devices (such as the stations STA1-STA4) to connect to another network (such as a local area network (LAN), wide area network (WAN), metropolitan area network (MAN), or the Internet).

In some implementations, each of the stations STA1-STA4 and each of the APs 110-116 may include one or more transceivers, one or more processing resources (such as processors or ASICs), one or more memory resources, and a power source (such as a battery for the stations STA1-STA4). The one or more transceivers may include Wi-Fi transceivers, Bluetooth transceivers, cellular transceivers, or other suitable radio frequency (RF) transceivers (not shown for simplicity) to transmit and receive wireless communication signals. In some implementations, each transceiver may communicate with other wireless devices in distinct frequency bands or using distinct communication protocols. The memory resources may include a non-transitory computer-readable medium (such as one or more nonvolatile memory elements, such as EPROM, EEPROM, Flash memory, a hard drive, etc.) that stores instructions for performing one or more operations described further with respect to FIGS. 2-7.

In some implementations, each of the APs 110-116 may periodically broadcast beacon frames to enable the stations STA1-STA4 and other wireless devices within their wireless ranges to establish and maintain a communication link with the respective one of the APs 110-116. The beacon frames, which are typically broadcast according to a target beacon transmission time (TBTT) schedule, may include timing synchronization function (TSF) values of one or more of the APs 110-116. The stations STA1-STA4 may synchronize their own local TSF values with the broadcast TSF values, for example, so that all the stations STA1-STA4 are synchronized with each other and with the APs 110-116. In some aspects, the beacon frames may indicate downlink (DL) data transmissions to the stations STA1-STA4, and may solicit or schedule uplink (UL) data transmissions from the stations STA1-STA4.

In some implementations, the AP 110 may operate as a root AP (RAP), and each of the APs 111-116 may operate as satellite APs (SAPs) (such as relay, repeater or range extender APs). The root AP 110 may facilitate communications between the root AP 110 and the satellite APs 111-116, and also may facilitate communications between the WLAN and other networks or systems. In some aspects, the root AP 110 may be connected via a wired connection 121 (such as through an Ethernet or PLC), or alternatively, via a wireless connection, or even a hybrid communication link, to a back-end network 120 such as, for example, a LAN, WAN, MAN, a communication service provider network, the Internet, or any combination thereof. The root AP 110 may be a central access point (CAP) or router which is communicatively coupled to the back-end network 120, or broadband network. Alternatively, the root AP 110 may be separate or collocated with a gateway device. A gateway device, such as a modem or router, may provide access to the back-end network 120. For example, the gateway device can couple to the back-end network 120 through a cable, a fiber optic, a powerline, or DSL network connection. The root AP 110 may be connected to each of the satellite APs 111-116 via either a wireless connection or a wired connection (not shown for simplicity).

In some implementations, the root AP 110 may be or may include a multi-AP (MAP) agent 130 and a MAP Controller 135. The MAP agent 130 may allow the root AP 110 to provide wireless services to a number of client devices (such as the stations STA1-STA4) and to communicate with one or more of the APs 111-116. The MAP Controller 135 may coordinate channel planning for the APs 110-116 and their associated client devices, and may configure one or more aspects of the downstream APs 111-116. For example, the MAP Controller 135 may directly provide wireless services to the fourth station STA4. In some implementations, the root AP 110 may use the MAP Controller 135 to steer one more of the stations STA1-STA4 to other APs or may steer one more of the APs 111-116 to other frequency bands (or both) based on a number of factors that may include, for example, changes in load balance on the APs 110-116, changes in traffic patterns of the network, changes in locations of the stations STA1-STA4, changes in bandwidth or service needs of the stations STA1-STA4, changes in channel conditions, changes in interference, changes in operating channels, changes in capacities of the APs 110-116, changes in available airtime for the APs 110-116, or any combination thereof. In addition, or in the alternative, the root AP 110 may use the MAP Controller 135 to generate one or more channel selection plans for the network. The channel selection plans may be used to dynamically assign operating channels to the APs 111-116 in a manner that considers the impact that each of the APs 111-116 (as well as their respective client devices) may have on the network, thereby optimizing network performance.

Although depicted in the example of FIG. 1 as being part of the root AP 110, the MAP Controller 135 may be separate from the root AP 110. In some other implementations, the root AP 110 may include the MAP Controller 135 but may not include the MAP agent 130 (and may not provide wireless service to client devices such as the stations STA1-STA4).

Each of the satellite APs 111-116 may be or may include a MAP agent 130 that allows the satellite APs 111-116 to provide wireless services to a number of client devices (such as the stations STA1-STA4). The MAP agent 130 also may allow their corresponding satellite APs 111-116 to communicate with downstream satellite APs or with upstream satellite APs (or both). For example, the MAP agent 130 may directly provide wireless services to the fourth station STA4. In some implementations, the satellite APs 111-116 may be used to extend the wireless coverage area of the root AP 110, for example, by operating as relay devices or range extender devices. In the example of FIG. 1, the root AP 110 and the satellite APs 111-116 are arranged in a tree topology in which the root AP 110 provides a connection between the WLAN and the back-end network 120, and the satellite APs 111-116 form various branches of the tree topology. For example, the first AP 111 forms a first branch of the tree topology, the second and third APs 112-113 form a second branch of the tree topology, and the fourth, fifth, and sixth APs 114-116 form a third branch of the tree topology. The first, second, and fourth APs 111, 112, and 114 are directly connected to the root AP 110, and therefore may be classified as 1-hop devices of the network. The third and fifth APs 113 and 115 are connected to the root AP 110 by intervening APs 112 and 114, respectively, and therefore may be classified as 2-hop devices of the network. The sixth AP 116 is connected to the root AP 110 by intervening APs 114 and 115, and therefore may be classified as a 3-hop device of the network.

For the example wireless network 100 of FIG. 1, the first station STA1 is currently associated with the first AP 111, the second station STA2 is currently associated with the second AP 112, the third station STA3 is currently associated with the third AP 113, and the fourth station STA4 is currently associated with the root AP 110. In some implementations, each of the root AP 110 and the satellite APs 111-116 may define its own Basic Service Set (BSS), and all client devices associated with a given AP may be included within the given AP's BSS. In some other implementations, the root AP 110 and a group of the satellite APs 111-116 may form an Extended Basic Services Set (ESS), and all client devices associated with the root AP 110 and the group of the satellite APs 111-116 may be included within the ESS.

The MAP Controller 135 may be used to assign operating channels for the root AP 110 and for one or more of the satellite APs 111-116 in a manner that optimizes network performance by considering the impact that each of the satellite APs 111-116 (as well as their respective client devices) may have on the network. In some implementations, the MAP Controller 135 may provide centralized channel selection planning for the network based on a number of network parameters observed by one or more of the satellite APs 111-116. The network parameters may include, for example, channel conditions, interference, traffic loads, traffic patterns, service needs of client devices, available channels, and other network utilization information observed by one or more of the satellite APs 111-116. In some aspects, the satellite APs 111-116 may determine one or more network parameters and transmit the determined network parameters to the root AP 110, for example, as described with respect to FIGS. 3-7.

In some other implementations, the APs 110-116 may be configured to operate as a mesh network. In a mesh network, the APs 110-116 may be directly connected to each other wirelessly in a non-hierarchical manner that allows the APs to cooperate with each other to efficiently route data to and from STAs. Some mesh networks may be referred to as Self-Organizing Networks (SONs). In a SON topology, the root AP 110 and the APs 111-116 do not need to be outfitted with a MAP agent 130, nor a MAP Controller 135. In some mesh network implementations, the root AP 110, or any of the APs 111-116, can be implemented as a SON Controller. In some implementations, the SON Controller may be configured to serve similar functions as the MAP Controller described above and throughout.

Figure 1B:
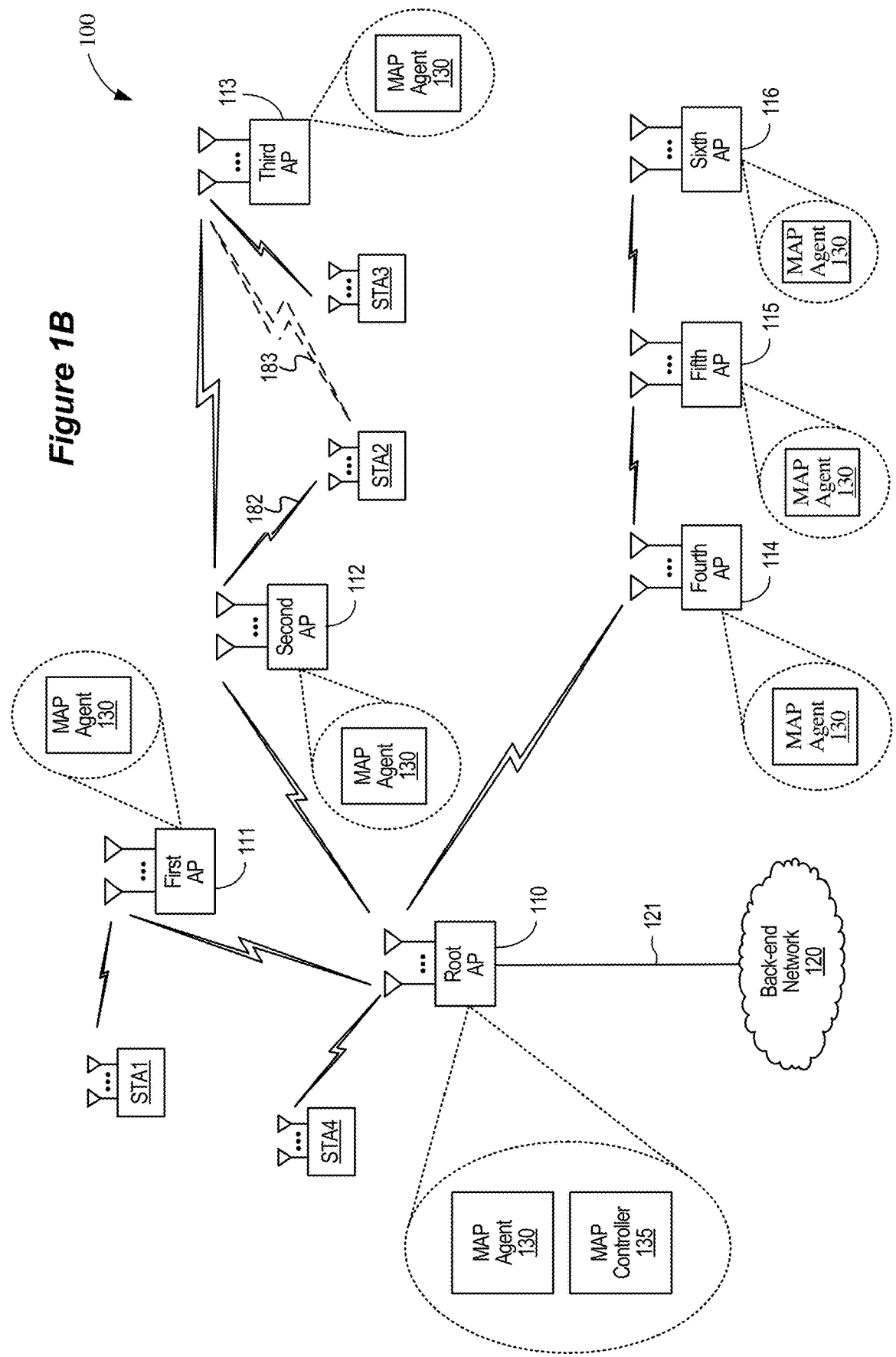
FIG. 1B shows an example multi-AP wireless network environment employing client steering.

FIG. 1B shows an example multi-AP wireless network 100 environment employing client steering. The wireless network 100 is similar to the wireless network 100 described with respect to FIG. 1A, and includes the same plurality of APs 110-116, as well as the same number of stations STA1-STA4.

In some implementations, one or more of the APs 110-116 may monitor the channel conditions of the channel currently used by the APs 110-116 in the wireless network 100. If the root AP 110 (in a root and satellite AP configuration), or another AP (in a mesh or SON configuration), determines that better goodput may be possible on another channel or frequency band (such as due to traffic on the current channel, channel interference caused by a neighboring wireless network, and so on), the root AP 110, or the another AP, may switch channels, for example, by broadcasting a channel switch announcement. In response thereto, the APs 111-116 may coordinate their channel switching operations with the root AP 110, or the other AP. Because the stations STA1-STA4 may need to re-associate with their respective associated APs when switching channels, the root AP 110, or other AP, may select or schedule a time to initiate the channel switch operation based, at least in part, on one or more characteristics of the traffic flows associated with the stations STA1-STA4, for example, to minimize service interruptions caused by channel switch operations.

In some implementations, the wireless network 100 may operate according to the enhanced distributed coordination channel access (EDCA) function described in the IEEE 802.11 family of standards. In such implementations, each of the stations STA1-STA4 may include a different transmit queue for each access category (AC), and the transmit queues are to independently contend for medium access. Because the APs 110-116 may serve multiple wireless devices at the same time, each of the APs 110-116 may include a plurality of transmit queues for each AC. More specifically, the APs 110-116 may classify downlink data (such as data to be transmitted to one or more of its associated STAs) based on a traffic identifier (TID) and a destination address (DA). The destination address (DA) indicates to which of the stations STA1-STA4 the data is to be transmitted. The TID indicates the priority level of the data, and thus may be mapped to a corresponding AC. By classifying downlink data according to its TID and DA, each of the APs 110-116 may aggregate data of the same priority level in a common set of AC queues that select from a corresponding range of back-off numbers (which can be used for medium access contention operations).

In some implementations, data may be assigned to one of four ACs: the highest priority data (such as voice data) may be assigned to a first access category (AC_VO); the second highest priority data (such as video data) may be assigned to a second access category (AC_VI); the third highest priority data (such as data associated with a "best effort" QoS) may be assigned to a third access category (AC_BE); and the lowest priority data (such as background data) may be assigned to a fourth access category (AC_BK). Although the four access categories described herein correspond to the access categories (AC_VO, AC_VI, AC_BE, and AC_BK) defined in the IEEE 802.11 family of standards, in some other implementations, the access categories described herein may be applicable to access categories or priority levels for other wireless protocols (such as cellular and Bluetooth®) or to wired protocols (such as Internet Protocol, Ethernet, HomePlug, powerline, EPON, EPOC, and so on).

As depicted in FIG. 1B, the first station STA1 is currently associated with the first AP 111, the second station STA2 is currently associated with the second AP 112, the third station STA3 is currently associated with the third AP 113, and the fourth station STA4 is currently associated with the root AP 110. In some implementations, it may be desirable to periodically consider steering the stations STA1-STA4 to other APs, or other frequency bands, or both, based, at least in part, on factors that may include (but are not limited to) changes in the load balance on the APs 110-116, changes in traffic characteristics, changes in locations of the stations STA1-STA4, changes in bandwidth or service needs of the stations STA1-STA4, changes in channel conditions, or changes in goodput of the APs 110-116.

In some aspects, it may be desirable to maintain the association of the first station STA1 with the first AP 111 based, at least in part, on the type of traffic addressed to the first station STA1 (such as when the first station STA1 is receiving real-time traffic such as, for example, gaming traffic or a VoIP call). Therefore, unless the client wants to change association of the first station STA1 with the first AP 111, the real-time traffic may not be interrupted even if there is a stronger AP available. Similarly, it may be desirable to maintain the association of the fourth station STA4 with the root AP 110 based, at least in part, on the type of traffic addressed to the fourth STA4, for example, in order to minimize the number of hops for such traffic. Therefore, a selected AP (including the root AP 110) may consider at least the above-mentioned factors when steering the stations STA1-STA4 between different APs, or between different frequency bands, or both. In some implementations, the selected AP also may selectively throttle traffic flows or alter the priority levels of traffic flows in conjunction with AP steering operations or frequency band steering operations.

Traffic characteristics may include a traffic flow's QoS and application type. QoS may be defined as a set of parameters that allows for the allocation of different levels of network services to different traffic flows. For example, when traffic through a network switch exceeds its bandwidth capacity, QoS parameters may be used to shape or police network traffic to ensure certain minimum service guarantees and to alleviate network congestion. QoS parameters for network traffic are typically defined by a service level agreement (SLA) in which a service provider contracts to transport packets of data across the service provider's network with certain assurances on the quality of the transport. The SLA may specify customer expectations of performance in terms of availability, packet delay, packet loss, priority, and bandwidth for specific types of traffic flow. For internet protocol (IP) traffic, traffic flows may be classified as constant bit rate (CBR) traffic, variable bit rate (VBR) traffic, unspecified bit rate (UBR) traffic, and available bit rate (ABR) traffic.

In some implementations, traffic flows may be classified as one of the following local traffic types: real-time traffic (such as gaming traffic or voice traffic (AC_VO)), streaming traffic (such as video traffic (AC_VI)), general traffic (such as best effort traffic (AC_BE)), and bulk traffic (such as background traffic (AC_BK)). Each of the local traffic types may have an implicit QoS demand. For example, real-time traffic may imply a need for low delay and low jitter, while bulk traffic may imply that data throughput is more important than packet delay. Thus, for at least some implementations, real-time traffic may correspond to CBR traffic (such as voice traffic), while bulk traffic may correspond to ABR traffic (such as background traffic).

More specifically, incoming traffic flows (such as traffic flows received by the root AP 110 from the back-end network 120) may be classified by the root AP 110, or another AP, by analyzing incoming packets for QoS markers or application type. If an incoming packet or traffic flow does not have any QoS markings (such as because the QoS markings were stripped by the service provider), then the root AP 110, or another AP, may perform deep packet inspection (or another suitable technique) on the packets to classify incoming traffic flows based on flow characteristics such as, for example, data rate, flow length or duration, flow ID, and so on. The root AP 110, or another AP, also may be able to determine a type of device to which the flow is intended (such as television, gaming console, smartphone, and so on). Thereafter, the root AP 110, or another AP, may make device steering decisions based, at least in part, on the traffic classifications or device type.

In some aspects, movement of a station within the wireless network 100 may be considered when determining whether to steer the station to a different AP, or to a different frequency band, or both. For example, if the fourth station STA4 is receiving a real-time VoIP flow and is moving away from the root AP 110 towards the first AP 111, the root AP 110 may decide to not steer the fourth station STA4 to the first AP 111 to avoid potential VoIP flow interruptions, even though the first AP 111 may be able to offer the fourth station STA4 better goodput than the root AP 110. Therefore, in some aspects, the decision to maintain the association of fourth station STA4 with the root AP 110 may be independent of the load on the first AP 111 (regardless of the load on the first AP 111). For another example, if the second station STA2 is engaging in bulk traffic (such as undergoing a background backup operation from the second station STA2 to a cloud storage device) and is moving away from the second AP 112 towards the third AP 113, the potential impact on the load of the third AP 113 may be considered prior to steering the second station STA2 to the third AP 113 (because once the second station STA2 is steered to the third AP 113, the bulk traffic may increase and consume more of the third AP 113's bandwidth than expected).

As a station moves to another location, the station can disassociate from a selected AP, and associate with another AP that has a stronger signal strength. In FIG. 1B, although the second station STA2 may initially be associated with the second AP 112, the second AP 112 may not be the optimal access point to provide services to the second station STA2. Furthermore, the second station STA2 may not be aware of the topology of the network in which one or more APs may be chained in various configurations to form an extended coverage area. The topology and backhaul utilization associated with one or more of the APs may impact the quality of service that can be provided to the second station STA2.

Considering the scenario depicted in FIG. 1B, the second station STA2 may be within range of the second AP 112 (via a first fronthaul channel 182), however, the second station STA2 may not know (or have access to) information about the network topology, backhaul utilization, or service capabilities associated with each of the APs 110-116. In some implementations, the APs 110-116 may assist in the identification of conditions in which the second station STA2 would be better served in the network by steering the device from the second AP 112 to the third AP 113 or the fourth AP 114. For example, the APs 110-116 may exchange information about channel utilization, network traffic flow, backhaul network conditions, network bandwidth availability, or the like. The backhaul network conditions may be based on a multi-hop path involving more than one AP that are wirelessly connected to each other (such as a chain) and to the root AP 110. The APs 110-116 may exchange information regarding wireless capacity to serve the second station STA2 based on the capabilities of the AP or the second station STA2 itself. In some implementations, the APs 110-116 may exchange information about the traffic flows for various devices connected to each respective AP. Using the collected information, the second AP 112 may estimate the performance that would be experienced by the second station STA2 using either the third AP 113 or the fourth AP 114. Selection of the target AP (to become a new serving AP) for the second station STA2 may be based on a comparison of estimated performance for each of the second, third and fourth APs 112, 113 and 114.

In some implementations, the second AP 112 may determine to steer the second station STA2 to the third AP 113. The second AP 112 may determine to drop the first fronthaul channel 182 to the second station STA2 and cause the second station STA2 to establish a wireless association over a second fronthaul channel 183 to the third AP 113. For example, the third AP 113 may provide better network performance (via the second fronthaul channel 183) to the second station STA2 than the second AP 112 (via the first fronthaul channel 182). Additionally, or alternatively, the third AP 113 may have better conditions to satisfy the QoS profile (as compared to the second AP 112). The better conditions may include less wireless utilization, a different frequency band, less backhaul latency, or the like. For example, the third AP 113 may provide a 5 GHz frequency band for communication with the second station STA2 which may be better suited for the type of traffic for the second station STA2 than a 2.4 GHz frequency band used by the second AP 112. In some implementations, one or more of the APs 110-116 may manage which devices associate with each of the APs 110-116 based on the type of traffic used by each device. For example, multimedia or low latency communications may be directed to the second AP 112, while best effort latency or reliable delivery communication may be directed to the third AP 113, or vice versa.

In some implementations, the second AP 112 may determine compatibility regarding wireless radio technologies utilized by the second station STA2 and available at the multiple APs. Different wireless radio technologies might be defined in standard specifications, such as the IEEE 802.11 family of standards. The wireless radio technologies may have different physical communication rates or protocols. The second AP 112 may utilize a first wireless radio technology utilized by a first set of devices and the third AP 113 may utilize a second wireless radio technology compatible with a second set of devices. If a device supports both the first wireless radio technology and the second wireless radio technology, a selection of the AP may be based on physical communication rates available from the wireless radio technologies. For example, the second AP 112 may determine to steer the second station STA2 to the third AP 113 as it may be associated with a faster effective physical communication rate than the second AP 112. In such implementations, the second AP 112 may command or steer the second station STA2 to utilize the third AP 113 rather than the second AP 112. In addition to steering the second station STA2 to a particular AP, the second AP 112 may select a particular frequency band (such as 2.4 GHz or 5 GHz) and channel, and steer the second station STA2 to utilize the selected frequency band and channel.

There may be various reasons for steering the second station STA2. For example, one or more fronthaul associations for one or more devices may be changed concurrently to improve the overall performance of the wireless network 100. For example, the root AP 110, or another AP, may have the second station STA2 transition from the second AP 112 to the third AP 113 to improve overall throughput through the wireless network 100. In some implementations, the second station STA2 may be steered to a different AP to perform load balancing on the wireless network 100. A decision to steer the second station STA2 may be made to accommodate a change in traffic demand (such as a change in the capacity requirement), quality of service (QoS) or other performance requirement (such as a change in the delay requirement) of the second station STA2. The QoS profile of the second station STA2 may include an increase or decrease to a capacity requirement or delay requirement, triggering a potential reason to perform a serving AP selection.

In some implementations, the steering decision may be based on a combination of fronthaul and backhaul conditions. For example, a path may include fronthaul and backhaul channels that self-contend. The capacity of the path may consider the fronthaul and backhaul contention timing or utilization constraints. The steering decision may be based on an application type. For example, a gaming application with an AC_VO designation may perform better with a lower number of hops between the device and the root AP 110 (or the gateway device). The types of traffic flows being used in the network may impact the steering decision. Thus, the APs 110-116 may exchange information about what traffic flows are being used at each AP.

In some implementations, one or more of the APs 110-116 may include a network analysis unit (not depicted, but a component associated with or incorporated within the AP) to obtain topology information about the wireless network 100 and performance information regarding the other APs in the wireless network 100. One or more of the APs 110-116 also may include a serving AP selection unit (not depicted, but a component associated with or incorporated within the AP) to select a new serving AP and steer the stations STA1-STA4 based on the information collected by the network analysis unit. The network analysis unit can be implemented to determine various channel conditions, wireless device configurations, and wireless device capabilities with respect to the components of the wireless network 100. For example, the network analysis unit can determine a topology of the network, including backhaul channels used by other APs to communicate to the root AP 110.

Referring back to the example in FIG. 1B, the second AP 112 may select a target AP, such as the third AP 113, as the serving AP for the second station STA2 based at least in part on path capacity and delay of a path from the target AP to the root AP 110. The selection of the target path may consider the QoS profile (such as the traffic type, capacity requirement, and delay requirement) of the second station STA2. For example, the second AP 112 may compare the estimated performance of candidate paths from each of the APs 111, 113, 114, 115 and 116, to the root AP 110. The estimated performance may be based on the backhaul channel utilization or the available airtime estimate for each fronthaul channel available at the APs 111, 113, 114, 115 and 116. As described above, the APs 110-116 and the stations STA1-STA4 can be DBDC devices capable of operating within two frequency bands. In some implementations, the network analysis unit can determine a current configuration and capability of the DBDC devices with respect to the operating frequency bands and links. For example, the network analysis unit can poll the APs 110-116 and the stations STA1-STA4 to determine their respective configurations and capabilities. The network analysis unit also can determine the configuration and capabilities of non-DBDC devices.

The serving AP selection unit may compare the estimated performance for the candidate paths with the QoS profile of the stations STA1-STA4 when selecting an appropriate target AP. The serving AP selection unit may be capable of using various techniques that consider the type of traffic being sent to or received by the device. For example, the serving AP selection unit may determine that the second station STA2 has delay sensitive traffic and may utilize a delay-focused selection technique for selecting the target path. If the second station STA2 does not have delay sensitive traffic, the serving AP selection unit may use a capacity-focused selection technique for selecting the target AP.

In some implementations, the serving AP selection unit may estimate the expected performance for each of a plurality of candidate paths available between the APs 111-116 and the root AP 110. For example, the serving AP selection unit may estimate an end-to-end capacity for each candidate path associated with the candidate APs 110-116. The serving AP selection unit may estimate an end-to-end delay for each candidate path. As such, the target path may be selected from among candidate paths in the wireless network 100 that satisfy the QoS profile of the stations STA1-STA4.

As newer and more diversified wireless devices proliferate in the marketplace alongside legacy wireless devices, multi-AP environments, including mesh and SON wireless networks, need improved approaches for steering such a wide variety of wireless devices to appropriate serving APs in the wireless network. As described above, while there may be many reasons to steer a wireless device from one AP to another AP, such as to meet the QoS profile of the wireless device, due to the AC of the data, the type of traffic flows, the topology of the network, the number of hops from the root AP, etc., the overall load balancing of the multi-AP environment may be improved by obtaining further granularity about each wireless device's capabilities and performance characteristics. Compiling each wireless device's capabilities and performance characteristics in a "wireless device profile" or "client profile" may enable the APs in the multi-AP environment to more effectively and efficiently serve data to each wireless device. Moreover, by assigning weights to each wireless device's capabilities and performance characteristics, and then ranking each wireless device according to the consolidated weights may enable the APs in the multi-AP environment to prioritize steering decisions for each wireless device. Additional details about profiles, assigning weights, and ranking wireless devices are further described throughout this disclosure.

Figure 2:
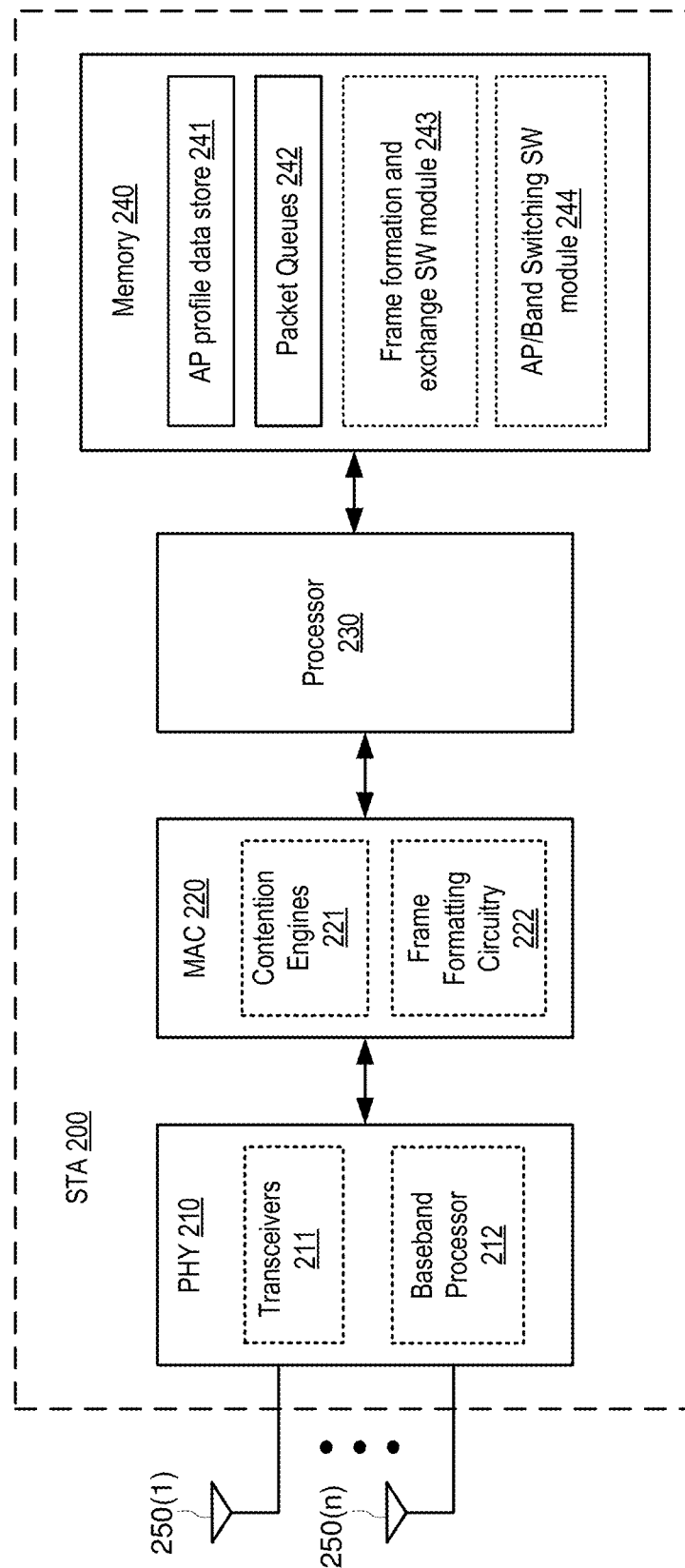
FIG. 2 shows a block diagram of an example station (STA).

FIG. 2 shows a block diagram of an example station (STA) 200. The STA 200 may be an implementation of one or more of the stations STA1-STA4, depicted and described in FIGS. 1A and 1B. The STA 200 may include various components or subcomponents. For example, the STA 200 may include a physical layer (PHY) device 210 including at least a number of transceivers 211 and a baseband processor 212. The STA 200 also may include a media access control layer (MAC) device 220 including at least a number of contention engines 221 and frame formatting circuitry 222. The STA 200 also may include a processor 230, may include a memory 240, and may include a number of antennas 250(1)-250(n).

The transceivers 211 may be coupled to the antennas 250(1)-250(n), either directly or through an antenna selection circuit (not shown for simplicity). The transceivers 211 may be used to transmit signals to and receive signals from the APs 110-116, depicted and described in FIGS. 1A and 1B, or other non-depicted wireless devices, and may be used to scan the surrounding environment to detect and identify nearby APs or other wireless devices (i.e., within a wireless range of the STA 200). Although not shown in FIG. 2 for simplicity, the transceivers 211 may include any number of transmit chains to process and transmit signals to other wireless devices via antennas 250(1)-250(n), and may include any number of receive chains to process signals received from the antennas 250(1)-250(n). Thus, in some implementations, the STA 200 may be configured for MIMO operations. The MIMO operations may include single-user MIMO (SU-MIMO) operations and multi-user MIMO (MU-MIMO) operations.

The baseband processor 212 may be used to process signals received from the processor 230, or the memory 240, and to forward the processed signals to the transceivers 211 for transmission via one or more of the antennas 250(1)-250(n), and may be used to process signals received from one or more of the antennas 250(1)-250(n) via the transceivers 211 and to forward the processed signals to the processor 230, or the memory 240.

The contention engines 221 may contend for access to one or more shared wireless mediums, and also may store packets for transmission over the one or more shared wireless mediums. The STA 200 may include one or more contention engines 221 for each of a plurality of different access categories (AC). In some implementations, the contention engines 221 may be separate from the MAC device 220. In some other implementations, the contention engines 221 may be implemented as one or more software modules (such as stored in the memory 240, or stored in memory provided within the MAC device 220) containing instructions that, when executed by the processor 230, perform the functions of the contention engines 221.

The frame formatting circuitry 222 may be used to create or format frames received from the processor 230, or the memory 240 (such as by adding MAC headers to PDUs provided by the processor 230), and may be used to re-format frames received from the PHY device 210 (such as by stripping MAC headers from frames received from the PHY device 210).

While the MAC device 220 is shown in FIG. 2 as being coupled between the PHY device 210 and the processor 230, in some implementations, the PHY device 210, the MAC device 220, the processor 230, or the memory 240 may be connected together using one or more buses (not shown for simplicity).

The memory 240 may include an AP profile data store 241 that stores profile information for a plurality of APs, such as the APs 110-116, depicted and described in FIGS. 1A and 1B. The profile information for a particular AP may include, for example, the AP's location, service set identification (SSID), media access control (MAC) address, channel information, received signal strength indicator (RSSI) values, goodput values, channel state information (CSI), timing information, supported data rates, supported frequency bands, connection history with the STA 200, supported or recently used modulation and coding schemes, and any other suitable information pertaining to or describing the operation of the AP.

In some implementations, the memory 240 also may include a STA profile data store (not depicted) that stores profile information for the STA 200. The profile information for the STA 200 is described further with respect to FIGS. 4-7.

The memory 240 may include a number of packet queues 242. The packet queues 242 may store packets to be transmitted from the STA 200 to one or more other wireless devices. In some implementations, the memory 240 may include one or more packet queues 242 for each of a plurality of different priority levels or ACs.

The memory 240 also may include a non-transitory computer-readable storage medium (such as one or more non-volatile memory elements, such as EPROM, EEPROM, Flash memory, a hard drive, and so on) that may store the following software (SW) modules:

A frame formation and exchange software module 243 to facilitate the creation and exchange of frames (such as management frames, control frames, and data frames), for example, as described for one or more operations of FIGS. 4-7; and An AP/band switching software module 244 to facilitate switching the association of the STA 200 between APs, or to facilitate switching the operation of the STA 200 between different frequency bands, or both, for example, as described for one or more operations of FIGS. 4-7.

Each software module includes instructions that, when executed by the processor 230, may cause the STA 200 to perform the corresponding functions. The non-transitory computer-readable medium of the memory 240 thus includes instructions for performing all or a portion of the operations described with respect to FIGS. 4-7.

The processor 230 may be any one or more suitable processors capable of executing scripts or instructions of one or more software programs stored in the STA 200 (such as within the memory 240). For example, the processor 230 may execute the frame formation and exchange software module 243 to facilitate the creation and exchange of frames (such as management frames, control frames, and data frames). The processor 230 also may execute the AP/band switching software module 244 to facilitate switching the association of the STA 200 between APs, or to facilitate switching the operation of the STA 200 between different frequency bands, or both.

In some implementations, the processor 230 may be a component of a processing system. A processing system may generally refer to a system or series of machines or components that receives inputs and processes the inputs to produce a set of outputs (which may be passed to other systems or components of, for example, the STA 200). For example, a processing system of the STA 200 may refer to a system including the various other components or subcomponents of the STA 200.

The processing system of the STA 200 may interface with other components of the STA 200, and may process information received from other components (such as inputs or signals), output information to other components, etc. For example, a chip or modem of the STA 200 may include a processing system, a first interface to output information, and a second interface to receive information. In some cases, the first interface may refer to an interface between the processing system of the chip or modem and a transmitter, such that the STA 200 may transmit information output from the chip or modem. In some cases, the second interface may refer to an interface between the processing system of the chip or modem and a receiver, such that the STA 200 may receive information or signal inputs, and the information may be passed to the processing system. A person having ordinary skill in the art will readily recognize that the first interface also may receive information or signal inputs, and the second interface also may transmit information.

Any one of these functionalities may be partially (or entirely) implemented in hardware, such as on the processor 230. For example, the functionality may be implemented with an application specific integrated circuit, in logic implemented in the processor 230, in a co-processor on a peripheral device or card, etc.

In some implementations, the STA 200 includes a user interface (UI) (such as a touchscreen or keypad) and a display, which may be integrated with the UI to form a touchscreen display. In some implementations, the STA 200 may further include one or more sensors such as, for example, one or more inertial sensors, accelerometers, temperature sensors, pressure sensors, or altitude sensors. One or more of the aforementioned components can communicate with other components directly or indirectly, such as over one or more bus interfaces, or wireless network interfaces.

Figure 3:
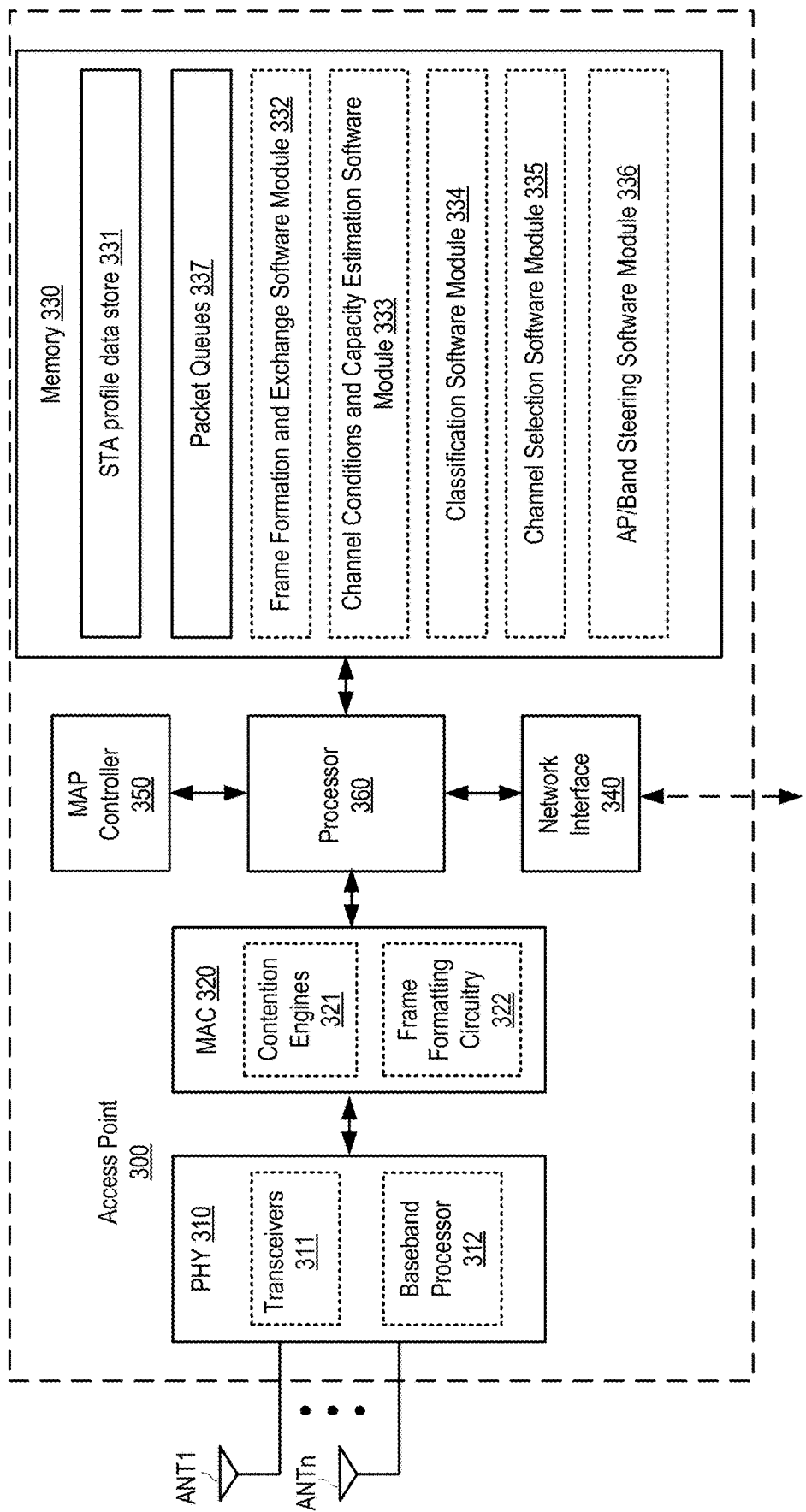
FIG. 3 shows a block diagram of an example AP.

FIG. 3 shows an example AP 300. The AP 300 may be an implementation of the root AP 110 of FIGS. 1A and 1B, may be an implementation of any of the APs 111-116 depicted in FIGS. 1A and 1B, or both. The AP 300 may include various components or subcomponents. For example, the AP 300 may include a PHY device 310 including one or more transceivers 311 and a baseband processor 312. The AP 300 also may include a MAC device 320 including at least a number of contention engines 321 and frame formatting circuitry 322. The AP 300 also may include a processor 360, a memory 330, a network interface 340, a MAP Controller 350, and a number of antennas ANT1-ANTn.

The transceivers 311 may be coupled to the antennas ANT1-ANTn, either directly or through an antenna selection circuit (not shown for simplicity). The transceivers 311 may be used to transmit signals to, and receive signals from, other wireless devices including, for example, one or more of the stations STA1-STA4, depicted and described in FIGS. 1A and 1B, as well as other APs. Although not shown in FIG. 3 for simplicity, the transceivers 311 may include any number of transmit chains to process and transmit signals to other wireless devices via the antennas ANT1-ANTn, and may include any number of receive chains to process signals received from the antennas ANT1-ANTn. Thus, the AP 300 may be configured for MIMO communications and OFDMA communications. The MIMO communications may include SU-MIMO communications and MU-MIMO communications. In some implementations, the AP 300 may use multiple antennas ANT1-ANTn to provide antenna diversity. Antenna diversity may include polarization diversity, pattern diversity, and spatial diversity.

The baseband processor 312 may be used to process signals received from processor 360, or the memory 330 and to forward the processed signals to transceivers 311 for transmission via one or more of the antennas ANT1-ANTn, and may be used to process signals received from one or more of the antennas ANT1-ANTn via transceivers 311 and to forward the processed signals to the processor 360 or the memory 330.

The contention engines 321 may contend for access to the shared wireless medium, and also may store packets for transmission over the shared wireless medium. In some implementations, the AP 300 may include one or more contention engines 321 for each of a plurality of different access categories (AC). In some other implementations, the contention engines 321 may be separate from the MAC device 320. In yet some other implementations, the contention engines 321 may be implemented as one or more software modules (such as stored in the memory 330 or within memory provided within the MAC device 320) containing instructions that, when executed by the processor 360, perform the functions of the contention engines 321.

The frame formatting circuitry 322 may be used to create or format frames received from the processor 360, or the memory 330 (such as by adding MAC headers to PDUs provided by the processor 360), and may be used to re-format frames received from the PHY device 310 (such as by stripping MAC headers from frames received from the PHY device 310).

The network interface 340, which is coupled to the processor 360, may be used to communicate with the back-end network 120 depicted in FIGS. 1A and 1B. The network interface 340 also may allow the AP 300 to communicate, either directly or via one or more intervening networks, with other wireless systems, with other APs, with STAs, and so on.

While the MAC device 320 is shown in FIG. 3 as being coupled between the PHY device 310 and the processor 360, in some implementations, the PHY device 310, the MAC device 320, the processor 360, the memory 330, or the network interface 340 may be connected together using one or more buses (not shown for simplicity).

The memory 330 may include a STA profile data store 331 that may store profile information for a plurality of STAs. The profile information (or STA profile, client profile, or wireless device profile) for a particular STA may include, for example, its MAC addresses, device type, traffic flow, location data, configuration information, supported data rates, timing information, modulation and coding schemes, preferred channels, ranging capabilities, bandwidth history, and other suitable information about (or pertaining to) the operation of the plurality of STAs. The STA profile data store 331, or database, also may store profile information for a number of other wireless devices. The profile information for a given wireless device may include, for example, the wireless device's service set identification (SSID), BSSID, operating channels, TSF values, beacon intervals, ranging schedules, channel state information (CSI), received signal strength indicator (RSSI) values, goodput values, and connection history with the AP. The profile information for the plurality of STAs may be statically defined based on the STAs capabilities and performance attributes, may be preconfigured (i.e., programmed before initial operation of the STA), or dynamically determined. Additional description about profile information is described further with respect to FIGS. 4-7.

The memory 330 also may include a number of packet queues 347. The packet queues 347 may store packets to be transmitted from the AP 300 to one or more other wireless devices, such as the stations STA1-STA4 depicted in FIGS. 1A and 1B. In some implementations, the memory 330 may include one or more packet queues 347 for each of a plurality of different priority levels or ACs. In some other implementations, the memory 330 may include packet queues for a plurality of different destinations (such as each of the stations STA1-STA4).

The memory 330 also may include a non-transitory computer-readable storage medium (such as one or more non-volatile memory elements, such as EPROM, EEPROM, Flash memory, a hard drive, and so on) that may store the following software modules:

A frame formation and exchange software module 332 to facilitate the creation and exchange of a number of frames (such as data frames, control frames, acknowledgement frames, management frames, and action frames) between the AP 300 and other wireless devices, for example, as described with respect to at least FIGS. 1A, 1B, and 4-7;

A channel conditions and capacity estimation software module 333 to estimate channel conditions and capacities of a number of wireless channels, to estimate available bandwidth and load information of a number of wireless devices, to estimate available airtime of wireless devices, to monitor traffic flows of a number of wireless devices, or any combination thereof, for example, as described with respect to at least FIGS. 1A, 1B, and 4-7;

A classification software module 334 to classify incoming packets, or traffic flows, into a number of traffic types, for example, as described with respect to at least FIGS. 1A, 1B, and 4-7;

A channel selection software module 335 to perform a number of channel selection operations to allocate operating channels to one or more APs within a network, for example, as described with respect to at least FIGS. 1A, 1B, and 4-7; and An AP/band steering software module 336 to facilitate steering wireless devices, such as the stations STA1-STA4, between different wireless associations (such as between different APs, or between different frequency bands, or both), based on a STA profile (also known as a client profile or wireless device profile), monitored traffic flow characteristics, classified traffic types, priority designations, movement of the wireless devices, QoS attributes, or a steering ranking list, for example, as described with respect to at least FIGS. 1A, 1B, and 4-7.

Each software module includes instructions that, when executed by the processor 360, may cause the AP 300 to perform the corresponding functions. The non-transitory computer-readable medium of the memory 330 thus includes instructions for performing all or a portion of the operations described with respect to at least FIGS. 1A, 1B, and 4-7.

The processor 360 may be any one or more suitable processors capable of executing scripts or instructions of one or more software programs stored in the AP 300 (such as within the memory 330). The processor 360 may execute the frame formation and exchange software module 332 to create and exchange a number of frames (such as data frames, control frames, acknowledgement frames, management frames, and action frames) between the AP 300 and other wireless devices.

The processor 360 may execute the channel conditions and capacity estimation software module 333 to estimate channel conditions and capacities of a number of wireless channels, to estimate available bandwidth and load information of a number of wireless devices, to estimate available airtime of wireless devices, or any combination thereof. The processor 360 may execute the classification software module 334 to classify incoming packets or traffic flows into a number of traffic types. The processor 360 may execute the channel selection software module 335 to perform a number of channel selection operations to allocate operating channels to one or more APs within a network.

The processor 360 may execute the AP/band steering software module 336 to facilitate steering wireless devices (such as one or more of the stations STA1-STA4 depicted in FIGS. 1A and 1B, or the station STA 200 depicted in FIG. 2) between different wireless associations (such as between different APs, like the APs 110-116 depicted in FIGS. 1A and 1B, or between different frequency bands within an AP, or both), based on a wireless device profile, monitored traffic flow characteristics, classified traffic types, priority designations, movement of the wireless devices, QoS attributes, or the steering ranking list. In some implementations, the AP/band steering software module 336 may be configured to update the steering ranking list. For example, the AP/band steering software module 336 may update the steering ranking list after each attempt to selectively steer at least one wireless device to a different wireless association in a multi-AP environment, such as in a mesh, or SON network.

In some implementations, the processor 360 may be a component of a processing system. A processing system may generally refer to a system or series of machines or components that receives inputs and processes the inputs to produce a set of outputs (which may be passed to other systems or components of, for example, the AP 300). For example, a processing system of the AP 300 may refer to a system including the various other components or subcomponents of the AP 300.

The processing system of the AP 300 may interface with other components of the AP 300, and may process information received from other components (such as inputs or signals), output information to other components, etc. For example, a chip or modem of the AP 300 may include a processing system, a first interface to output information, and a second interface to receive information. In some cases, the first interface may refer to an interface between the processing system of the chip or modem and a transmitter, such that the AP 300 may transmit information output from the chip or modem. In some cases, the second interface may refer to an interface between the processing system of the chip or modem and a receiver, such that the AP 300 may receive information or signal inputs, and the information may be passed to the processing system. A person having ordinary skill in the art will readily recognize that the first interface also may receive information or signal inputs, and the second interface also may transmit information.

Any one of these functionalities may be partially (or entirely) implemented in hardware, such as on the processor 360. For example, the functionality may be implemented with an application specific integrated circuit, in logic implemented in the processor 230, in a co-processor on a peripheral device or card, etc.

While not depicted, in some implementations, the AP 300 may include a network analysis unit and a serving AP selection unit. In some implementations, the network analysis unit and serving AP selection unit, can be distributed within the processor 360 or the memory 330. The network analysis unit and serving AP selection unit can perform some or all of the operations described in FIGS. 1A, 1B and 3. The network analysis unit can determine topology and performance information regarding wireless devices, such as STAs, or other APs in the network. The serving AP selection unit can select a new target serving AP from among the APs in the network using the topology and performance information obtained by the network analysis unit. The serving AP selection unit can steer a device (such as a client STA) to the new target serving AP.

The MAP Controller 350 may be coupled to the processor 360 and to the memory 330. In some implementations, the MAP Controller 350 may be one example of the MAP Controller 135 depicted in FIGS. 1A and 1B. In addition, or in the alternative, the MAP Controller 350 may be implemented as a software program or module including instructions stored in the memory 330 for execution by the processor 360, and may be used to perform one or more of the operations described with respect to at least FIGS. 1A, 1B, and 4-7.

Figure 6:
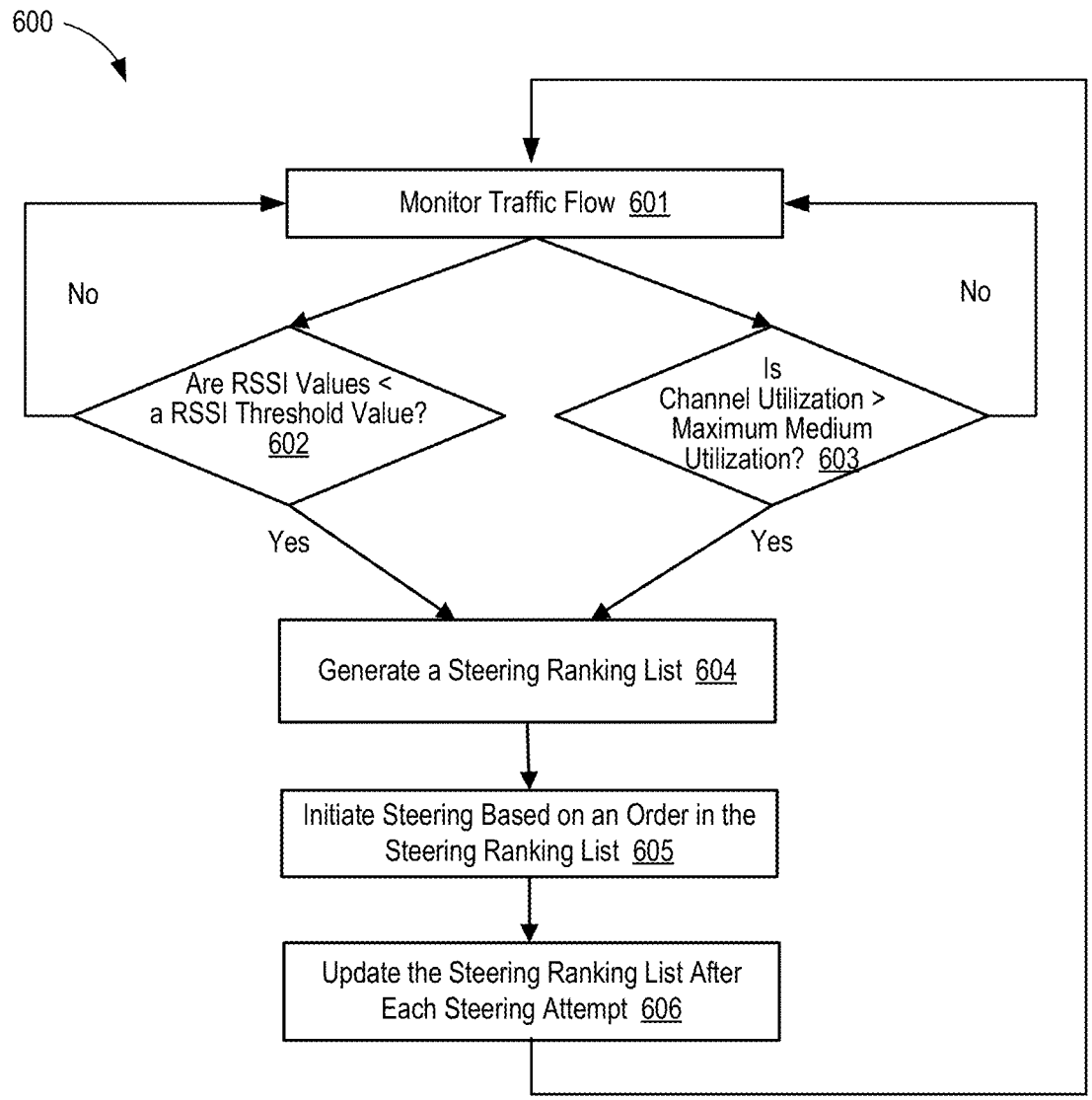
FIG. 6 shows an example process flow diagram for initiating steering of one or more wireless devices based on a steering ranking list.
Figure 7:
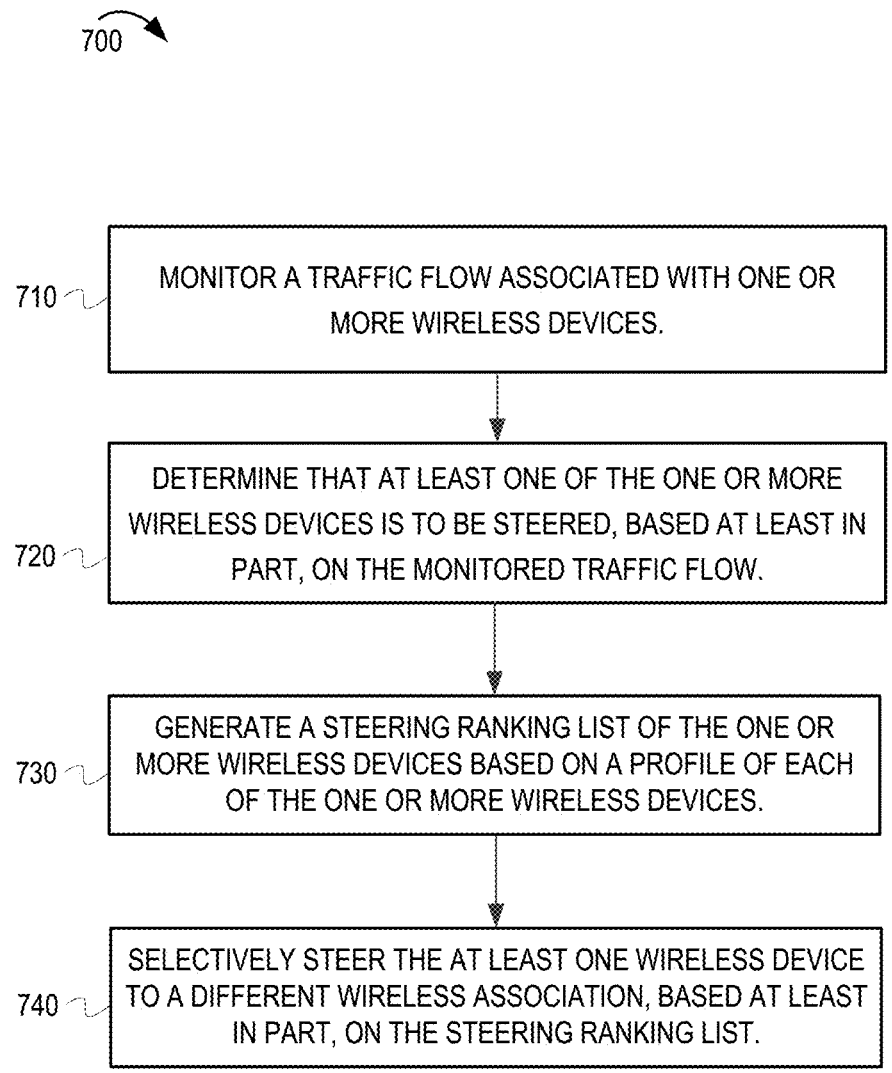
FIG. 7 shows an example method of steering one or more wireless devices in a multi-AP environment.

The AP 300 may include means for performing one or more operations described herein, such as the process flow diagram 600 and the method 700 depicted and described in FIGS. 6 and 7, respectively. In some aspects, such means may include one or more components of the AP 300 described in connection with the APs 110-116 or the stations STA1-STA4 depicted and described throughout this disclosure.

FIG. 4 shows an example table 400 of wireless device capability categories with assigned weights. The example table 400 includes three columns and multiple rows and subrows. The first column denotes wireless device capability categories 420, the second column denotes wireless device capability subcategories 440, and the third column denotes assigned weights 450 for each of the capability subcategories 440.

The capability categories 420 relates to the various capabilities and performance characteristics of a wireless device, such as any of the stations STA1-STA4, depicted and described in FIGS. 1A and 1B, as well as the station STA 200, depicted and described in FIG. 2. The capability categories 420 include: a Wi-Fi multimedia (WMM) access category (AC) designation 421, a number of spatial streams supported 422, a high throughput (HT) operation mode 423, radio capabilities 424, a modulation and coding scheme (MCS) transmission rate 425, a data rate of the monitored traffic flow 426, a multi-user (MU)-multiple input and multiple output (MIMO) compatibility 427, an orthogonal frequency-division multiplexing (OFDM)/orthogonal frequency-division multiple access (OFDMA) compatibility 428, a mobility designation 429, a hop count of the connected AP from the root AP 430, a service based classification 431, a priority designation 432, and a steering success rate 433. Although not depicted, the capability categories 420 also may include a QoS prioritization, a very high throughput (VHT) or extremely high throughput (EHT) operation mode indicator, a legacy mode transmission rate, a traffic type of the monitored traffic flow, and the like.

The capability subcategories 440 provide further granularity to each of the capability categories 420. The assigned weights 450 provide a weighted ranking for each of the capability subcategories 440. The weighted ranking for each of the capability subcategories 440 can be assigned in relation to the other capability subcategories 440. For example, the WMM AC designation 421 can be divided into four capability subcategories 440, such as the four access categories described above, namely, AC_VO, AC_VI, AC_BE and AC_BK. Since data and traffic flows categorized as AC_VO are prioritized over other data and traffic flows, the AC_VO subcategory is weighted higher than the other subcategories. As an example, the AC_VO subcategory can be assigned a weight of 4. As a corollary, the AC_VI subcategory can be assigned a weight of 3, the AC_BE subcategory can be assigned a weight of 2, and the AC_BK subcategory can be assigned a weight of 1.

Similarly, the number of spatial streams supported 422 can be divided into four capability subcategories 440, with four spatial streams supported being assigned a weight of 4, with three spatial streams supported being assigned a weight of 3, with two spatial streams supported being assigned a weight of 2, and with a single spatial stream supported being assigned a weight of 1.

The HT operation mode 423 can be divided into four capability subcategories 440, with HT 160 MHz bandwidth or 80 MHz+80 MHz bandwidth support being assigned a weight of 4, with HT 80 MHz bandwidth support being assigned a weight of 3, with HT 40 MHz bandwidth support being assigned a weight of 2, and with HT 20 MHz bandwidth support being assigned a weight of 1.

The radio capabilities 424 can be divided into four capability subcategories 440, with 802.11ax support being assigned a weight of 4, with 802.11ac support being assigned a weight of 3, with 802.11n support being assigned a weight of 2, and with 802.11a, b or g support being assigned a weight of 1.

The MCS transmission rate 425 can be divided into four capability subcategories 440, with MCS Index 9 support being assigned a weight of 4, with MCS Index 7-8 support being assigned a weight of 3, with MCS Index 4-6 support being assigned a weight of 2, and with less than MCS Index 4 support being assigned a weight of 1.

The data rate of the monitored traffic flow 426 can be divided into three capability subcategories 440, with devices receiving less than 10 Megabits per second (Mbps) being assigned a weight of 8, with devices receiving between 10-50 Mbps being assigned a weight of 4, and with devices receiving greater than 50 Mbps being assigned a weight of 2.

The MU-MIMO compatibility 427 can be divided into two capability subcategories 440, with devices supporting MU-MIMO being assigned a weight of 10, while devices not supporting MU-MIMO being assigned a weight of 5.

The OFDM/OFDMA compatibility 428 can be divided into two capability subcategories 440, with devices supporting OFDM/OFDMA being assigned a weight of 10, while devices not supporting OFDM/OFDMA being assigned a weight of 5. In some implementations, and depending on the application traffic, wireless devices supporting OFDM/OFDMA transmissions may be preferred devices for steering.

The mobility designation 429 can be divided into two capability subcategories 440, with moving devices being assigned a weight of 4, and with stationary devices being assigned a weight of 5.

The hop count of the connected AP from the root AP 430 can be divided into four capability subcategories 440, with zero hops (or in other words being served by the root AP) being assigned a weight of 4, with one hop being assigned a weight of 3, with two hops being assigned a weight of 2, and with more than two hops being assigned a weight of 1.

The service based classification 431 can be divided into five capability subcategories 440, with mobile phones (including smartphones) and tablets being assigned a weight of 10, with laptops being assigned a weight of 8, with embedded client devices being assigned a weight of 6, with IOT client devices being assigned a weight of 4, and with desktops being assigned a weight of 2.

The priority designation 432 can be divided into three capability subcategories 440, with medical equipment-related devices being assigned a weight of 20, with emergency services-related devices being assigned a weight of 15, and with security-related devices being assigned a weight of 10. In some implementations, the priority designation 432 can indicate a level of criticality of the traffic type. For example, the traffic type of the monitored traffic flows of medical equipment-related devices, such as breathing apparatuses, etc., can be very critical (i.e., a life or death situation), so weighting these types of devices greater than typical wireless devices can ensure they are prioritized in steering situations. In some implementations, the priority designation 432 can be statically defined in a wireless device "profile." For example, a set of "priority wireless devices," such as "most frequently served wireless devices" or the like, may be defined. This set of priority wireless devices may be treated as the most preferable wireless devices in the BSS, and may receive favorable weighting metrics. In some other implementations, that priority designation 432 can be dynamically defined due to changing wireless device capabilities, performance characteristics, or operations (such as the wireless device taking on a security-related device responsibility).

The steering success rate 433, or steering failure penalty, has a single capability subcategory 440, with devices being assigned a weight of negative 2 (i.e., −2) for each time the device fails to be steered to a different AP, or different frequency band, or both. The steering success rate 433 can be based on one or more historical attempts to steer a wireless device to a different wireless association. For example, if the wireless device has failed to steer to a new, or different, wireless association, the steering success rate 433 weighting metric may be reduced. In some implementations, the higher the number of steering failures, the lower the steering success rate 433 will be for the wireless device, and the wireless device may be considered as a steering unfriendly client. In some implementations, one or more APs may maintain a history of the steering attempts made for client devices in the network.

A person having ordinary skill in the art will readily recognize that the table 400 is merely an example, and in some other implementations, the table may include additional columns, or rows/subrows, or both. Furthermore, a person having ordinary skill in the art will readily recognize that the assigned weights 450 are merely examples, and that other values, ranges and ratios can be used.

Figure 5:
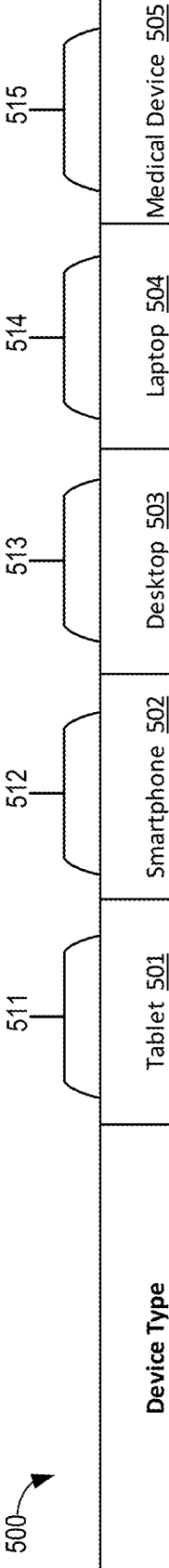
FIG. 5 shows an example of wireless device profiles in a steering ranking list.

FIG. 5 shows an example of wireless device profiles in a steering ranking list 500. The example steering ranking list 500 provides information related to five wireless devices, i.e., a tablet 501, a smartphone 502, a desktop 503, a laptop 504 and a medical device 505. Each of the wireless devices 501-505 can include a wireless device profile 511-515 (also known as a client profile, a STA profile, or simply a profile), respectively. The wireless device profiles 511-515 can include information related to the respective wireless device's capabilities and performance characteristics, i.e., one or more wireless device capability categories 520, in addition to the type (such as brand, make and model) of the wireless devices 501-505, the Wi-Fi radio capability of the wireless devices 501-505, and the type of traffic the wireless devices 501-505 are engaged with. The wireless device profiles 511-515 can be organized, can be analyzed, can have weights assigned to, and can be ranked in the steering ranking list 500.

The wireless device profiles 511-515 can be used by an AP, such as the APs 110-116, depicted and described in FIGS. 1A and 1B, or the AP 300, depicted and described, in FIG. 3, to make steering decisions. Aspects of the wireless device profiles 511-515 may be provided to an AP in a variety of ways. For example, the wireless device profiles 511-515 may be pre-designated by the original equipment manufacturer (OEM) and provided to the AP upon initial association. In another example, the wireless device profiles 511-515 may be learned by the AP after the initial association.

The capability categories 520 may be an implementation of the capability categories 420, depicted and described in FIG. 4. The capability categories 520 relate to the various capabilities and performance characteristics of a wireless device, such as any of the stations STA1-STA4, depicted and described in FIGS. 1A and 1B, as well as the station STA 200, depicted and described in FIG. 2. The capability categories 520 include: a Wi-Fi multimedia (WMM) access category (AC) designation 521, a number of spatial streams supported 522, a high throughput (HT) operation mode 523, radio capabilities 524, a modulation and coding scheme (MCS) transmission rate 525, a data rate of the monitored traffic flow 526, an indicator for MU-MIMO compatibility 527, an indicator for OFDM/OFDMA compatibility 528, a mobility designation 529, a hop count of the connected AP from the root AP 530, a service based classification 531, a priority designation 532, and a steering success rate 533. Again, although not depicted, the capability categories 520 also may include a QoS prioritization, a VHT or EHT operation mode indicator, a legacy mode transmission rate, a traffic type of the monitored traffic flow, and the like.

The wireless device profiles 511-515 can be generated by or at an AP, such as any of the APs 110-116, depicted and described in FIGS. 1A and 1B, or the AP 300, depicted and described in FIG. 3. The wireless device profiles 511-515 can be stored by or at an AP such as any of the APs 110-116, depicted and described in FIGS. 1A and 1B, or the AP 300, depicted and described in FIG. 3. In some implementations, the wireless device profiles 511-515 can be stored in the STA profile data store 331 of the AP 300, depicted and described in FIG. 3.

In conjunction with the table 400 depicted in FIG. 4, an AP can assign weights for each of the capability categories 520 in the wireless device profiles 511-515. The weights assigned for each of the capability categories 520 can be added, or subtracted, together to form a consolidated weights 550 for each of the wireless devices 501-505. In some implementations, the consolidated weights 550 may be calculated by using other mathematical operations, such as multiplying or dividing one or more values to the weights assigned for each of the capability categories 520. One or more APs, or components residing therein, can compare the consolidated weights 550 based on the wireless device profiles 511-515 of each of the wireless devices 501-505 to assign device steering ranks 570. The device steering ranks 570 can be utilized as a mechanism to prioritize the steering of the wireless devices 501-505 in a wireless network. In other words, one or more of the wireless devices 501-505 can be prioritized for steering to a different wireless association (i.e., steering to a different AP, or steering to a different frequency band, or both) based on its position the device steering ranks 570. In some implementations, selectively steering one or more of the wireless devices 501-505 can occur based on a priority order of the device steering ranks.

In the example depicted in FIG. 5, the wireless device 505 which is a medical device, and engaging in medical monitoring, has a consolidated weight 550 of 71, and a device steering rank 570 of first (1'), so it will be the first wireless device of the wireless devices 501-505 to be prioritized, or targeted, for steering, if the multi-AP environment determines that steering may improve network capacity or load balancing. By reviewing the table 400 depicted in FIG. 4, along with the wireless device weights, it can be determined that the wireless device's 505 medical monitoring is occurring over the WMM AC designation 521 AC_VI, or video data (i.e., weight of 3), the wireless device 505 supports two spatial streams 522 (i.e., weight of 2), the wireless device 505 supports the HT 80 MHz bandwidth operating mode 523 (i.e., weight of 3), the wireless device 505 supports WiFi 802.11ac radio capability 524 (i.e., weight of 3), the wireless device's 505 MCS transmission rate 525 is within MCS Index 4-6 (i.e., weight of 2), the wireless device's 505 data rate of the monitored traffic flow 526 is less than 10 Mbps (i.e., weight of 8), the wireless device 505 has MU-MIMO compatibility 527 (i.e., weight of 10), the wireless device 505 has OFDM/OFDMA compatibility 528 (i.e., weight of 10), the wireless device's 505 mobility designation 529 is stationary (i.e., weight of 2), the hop count of the connected AP from the root AP 530 that is serving the wireless device 505 is two hops (i.e., weight of 2), the wireless device 505 has a service based classification 531 of an embedded client (i.e., weight of 6), the wireless device 505 has a priority designation 532 of a high profile client engaging in medical equipment operations (i.e., weight of 20), and the wireless device has a successful steering success rate 533 (i.e., weight of 0).

The wireless device 501, which is a tablet, and engaging in a Skype call, has a consolidated weight 550 of 61, and a device steering rank 570 of second ($2^{nd}$), so it will be the second wireless device of the wireless devices 501-505 to be targeted for steering. By reviewing the table 400 depicted in FIG. 4, along with the wireless device weights, it can be determined that the wireless device's 501 Skype call is occurring over the WMM AC designation 521 AC_VO, or voice data (i.e., weight of 4), the wireless device 501 supports two spatial streams 522 (i.e., weight of 2), the wireless device 501 supports the HT 80 MHz bandwidth operating mode 523 (i.e., weight of 3), the wireless device 501 supports WiFi 802.11ac radio capability 524 (i.e., weight of 3), the wireless device's 501 MCS transmission rate 525 is within MCS Index 7-8 (i.e., weight of 3), the wireless device's 501 data rate of the monitored traffic flow 526 is less than 10 Mbps (i.e., weight of 8), the wireless device 501 has MU-MIMO compatibility 527 (i.e., weight of 10), the wireless device 501 has OFDM/OFDMA compatibility 528 (i.e., weight of 10), the wireless device's 501 mobility designation 529 is moving (i.e., weight of 4), the hop count of the connected AP from the root AP 530 that is serving the wireless device 501 is zero hops (i.e., weight of 4), the wireless device 501 has a service based classification 531 of a tablet device (i.e., weight of 10), the wireless device 501 does not have a priority designation 532 (i.e., weight of 0), and the wireless device has a successful steering success rate 533 (i.e., weight of 0).

The wireless device 502, which is a smartphone, and engaging in a multiplayer gaming operation, has a consolidated weight 550 of 58, and a device steering rank 570 of third ($3^{rd}$), so it will be the third wireless device of the wireless devices 501-505 to be targeted for steering. By reviewing the table 400 depicted in FIG. 4, along with the wireless device weights, it can be determined that the wireless device's 502 multiplayer gaming session is occurring over the WMM AC designation 521 AC_VI, or video data (i.e., weight of 3), the wireless device 502 supports two spatial streams 522 (i.e., weight of 2), the wireless device 502 supports the HT 80 MHz bandwidth operating mode 523 (i.e., weight of 3), the wireless device 502 supports WiFi 802.11ax radio capability 524 (i.e., weight of 4), the wireless device's 502 MCS transmission rate 525 is within MCS Index 9 (i.e., weight of 4), the wireless device's 502 data rate of the monitored traffic flow 526 is less than 10 Mbps (i.e., weight of 8), the wireless device 502 has MU-MIMO compatibility 527 (i.e., weight of 10), the wireless device 502 has OFDM/OFDMA compatibility 528 (i.e., weight of 10), the wireless device's 502 mobility designation 529 is stationary (i.e., weight of 2), the hop count of the connected AP from the root AP 530 that is serving the wireless device 502 is zero hops (i.e., weight of 4), the wireless device 502 has a service based classification 531 of a smartphone (i.e., weight of 10), the wireless device 502 does not have a priority designation 532 (i.e., weight of 0), and the wireless device has a history of steering failures, so it has a negative steering success rate 533 (i.e., weight of −2).

The wireless device 504, which is a laptop, and engaging in a YouTube livestreaming session, has a consolidated weight 550 of 54, and a device steering rank 570 of fourth ($4^{th}$), so it will be the fourth wireless device of the wireless devices 501-505 to be targeted for steering. By reviewing the table 400 depicted in FIG. 4, along with the wireless device weights, it can be determined that the wireless device's 504 YouTube livestream session is occurring over the WMM AC designation 521 AC_VI, or video data (i.e., weight of 3), the wireless device 504 supports two spatial streams 522 (i.e., weight of 2), the wireless device 504 supports the HT 80 MHz bandwidth operating mode 523 (i.e., weight of 3), the wireless device 504 supports WiFi 802.11ax radio capability 524 (i.e., weight of 4), the wireless device's 504 MCS transmission rate 525 is less than MCS Index 4 (i.e., weight of 1), the wireless device's 504 data rate of the monitored traffic flow 526 is less than 10 Mbps (i.e., weight of 8), the wireless device 504 has MU-MIMO compatibility 527 (i.e., weight of 10), the wireless device 504 has OFDM/OFDMA compatibility 528 (i.e., weight of 10), the wireless device's 504 mobility designation 529 is stationary (i.e., weight of 2), the hop count of the connected AP from the root AP 530 that is serving the wireless device 504 is one hop (i.e., weight of 3), the wireless device 504 has a service based classification 531 of a laptop (i.e., weight of 8), the wireless device 504 does not have a priority designation 532 (i.e., weight of 0), and the wireless device has a successful steering success rate 533 (i.e., weight of 0).

The wireless device 503, which is a desktop, and engaging in a torrent download, has a consolidated weight 550 of 30, and a device steering rank 570 of fifth ($5^{th}$), so it will be the fifth wireless device of the wireless devices 501-505 to be targeted for steering. By reviewing the table 400 depicted in FIG. 4, along with the wireless device weights, it can be determined that the wireless device's 503 Torrent downloading session is occurring over the WMM AC designation 521 AC_BK, or background data (i.e., weight of 1), the wireless device 503 supports two spatial streams 522 (i.e., weight of 2), the wireless device 503 supports the HT 40 MHz bandwidth operating mode 523 (i.e., weight of 2), the wireless device 503 supports WiFi 802.11n radio capability 524 (i.e., weight of 2), the wireless device's 503 MCS transmission rate 525 is within MCS Index 4-6 (i.e., weight of 2), the wireless device's 503 data rate of the monitored traffic flow 526 is between 10-50 Mbps (i.e., weight of 4), the wireless device 503 does not have MU-MIMO compatibility 527 (i.e., weight of 5), the wireless device 503 does not have OFDM/OFDMA compatibility 528 (i.e., weight of 5), the wireless device's 503 mobility designation 529 is stationary (i.e., weight of 2), the hop count of the connected AP from the root AP 530 that is serving the wireless device 503 is one hop (i.e., weight of 3), the wireless device 503 has a service based classification 531 of a desktop (i.e., weight of 2), the wireless device 503 does not have a priority designation 532 (i.e., weight of 0), and the wireless device has a successful steering success rate 533 (i.e., weight of 0).

The steering ranking list 500 can be updated after each attempt to selectively steer a wireless device to a different wireless association in the wireless network. In some implementations, after an attempt to steer a wireless device has occurred, the weights assigned for each of the capability categories 520 can be reevaluated and updated for each of the wireless devices 501-505. In some other implementations, after an attempt to steer a wireless device has occurred, that wireless device may be automatically ranked last in the device steering rank 570. In some implementations, if a wireless device fails to steer to the different wireless association, the wireless device's device steering rank 570 may be reduced, while simultaneously, the device steering rank 570 of the other wireless devices 501-505 will be updated (and potentially upranked).

In some implementations, the steering ranking list 500 can be statically defined, such as through a configuration protocol by an AP entity. Alternatively, the steering ranking list can be statically defined, such as through a graphical user interface (GUI) or via a wireless controller from the cloud by one or more user, retail carriers or enterprise customers. In some implementations, a user, retail carrier or enterprise customer can program, arrange or sort the steering ranking list through an application programming interface (API). In some other implementations, the steering ranking list 500 can be generated dynamically by one or more APs, or components of APs, in a multi-AP environment. For example, the steering ranking list 500 may be generated dynamically by the processor 360, in association with the memory 330, the STA profile data store 331, and the AP/band steering software module 336, depicted and described in FIG. 3.

In some implementations, the wireless device profiles 511-515 can include a wireless device profile-based steering bit. If the profile-based steering bit is enabled, or set, in the wireless device profiles 511-515, one or more of the APs in the multi-AP environment can mark the respective wireless device for steering according to the implementations described in this disclosure.

When one or more of the wireless devices 501-505 is marked for steering, the serving AP can be implemented to send a steering-related message to another AP in the multi-AP environment. The serving AP also can send a steering request to the one or more of the wireless devices 501-505, where the steering request instructs the one or more of the wireless devices 501-505 to join a BSS of the another AP. In some SON implementations, the serving AP can send a steering request to the one or more of the wireless devices 501-505, and through a proprietary SON protocol, can inform another AP that it should expect the wireless device to join the another AP's BSS. In some such SON implementations, the serving AP can inform the another AP as to the reason for why the wireless device is being steered to the another AP's BSS (i.e., based, in part, on the wireless device profiles 511-515. Alternatively, in some SON implementations, the root AP (or serving as the Multi-AP Controller, or SON Controller) of the multi-AP environment can send such steering-related messages to the one or more of the wireless devices 501-505 and the another AP.

FIG. 6 shows an example process flow diagram 600 for initiating steering of one or more wireless devices based on a steering ranking list. The operations of the process flow diagram 600 may be implemented by the root AP 110, depicted and described in FIGS. 1A and 1B, or its components described throughout. The operations of the process flow diagram 600 also may be implemented by one or more of the APs 111-116, depicted and described in FIGS. 1A and 1B, or their components as described throughout. Additionally, the operations of the process flow diagram 600 may be implemented by the AP 300, depicted and described in FIG. 3, or its components as described throughout.

In some implementations, the root AP 110, the APs 111-116, the AP 300, or the AP 200, may execute a set of codes to control the functional elements of the respective device, or of one or more other devices, to perform the functions described in FIG. 6. Additionally, or alternatively, the root AP 110, the APs 111-116, or the AP 300, may perform aspects of the functions described in FIG. 6 using special-purpose hardware.

At block 601, a traffic flow associated with one or more wireless devices may be monitored. One or more APs operating in a multi-AP environment, such as the root AP 110, one or more of the APs 111-116, or the AP 300, may monitor the traffic flow of one or more wireless devices, such as the stations STA1-STA4, depicted and described in FIGS. 1A and 1B, the station STA 200, depicted and described in FIG. 2, or the wireless devices 501-505, depicted and described in FIG. 5. For example, the traffic flow may be monitored by the channel conditions and capacity estimation software module 333, or the classification software module 334, depicted and described in FIG. 3. The traffic flow can be monitored based on one or more packets or frames associated with, or related to, the one or more wireless devices. For example, the traffic flows can be monitored by obtaining, observing, or sniffing packets, such as acknowledgement (ACK) packets or the like, or frames, associated signal-to-noise (SNR) ratio values, transmission byte counts, receiving byte counts, modulation and coding scheme (MCS) values, packet error rate (PER) values, spatial stream values, data rate values, received signal strength indicator (RSSI) values, as well as channel utilization values, etc. The AP may continuously monitor the traffic flow, may periodically monitor the traffic flow, or may monitor the traffic flow upon the occurrence of a command or event.

At determination block 602, the AP may determine whether RSSI values associated with the monitored traffic are below a threshold RSSI value. In some implementations, a processor of the AP, such as the processor 360, depicted and described in FIG. 3, may determine whether the RSSI values associated with the monitored traffic are below the threshold RSSI value. In other words, the processor can compare the RSSI values of the monitored traffic flow to the RSSI threshold value. In some implementations, the RSSI threshold value may be −40 decibels per milliwatt (dBm) to −50 dBm (indicating that the signal strength is strong, and the wireless device is receiving a strong signal), or −45 dBm to −55 dBm, or 50 dBm to −60 dBm, or −55 dBm to −65 dBm, or −60 dBm to −70 dBm, or −65 dBm to −75 dBm, or −70 dBm to −80 dBm, or −75 dBm to −85 dBm, etc. The RSSI threshold value may be predetermined, configurable, or dynamically adjusted, depending on the particular implementation. For example, if the RSSI values associated with the monitored traffic fall below the −65 dBm to −75 dBm RSSI threshold value, the wireless device receiving the monitored traffic flow may be marked for steering to another AP, another frequency band, or both.

In some other implementations, the AP may determine whether SNR values associated with the monitored traffic are below a threshold SNR value. In some implementations, the SNR threshold value may be below 15 dBm (indicating that the signal is poor and not well received by the wireless device), between 15 dBm and 25 dBm, between 25 dBm and 40 dBm, or greater than 40 dBm. The SNR threshold may be predetermined, configurable, or dynamically adjusted, depending on the particular implementation. For example, if the SNR values of the monitored traffic fall below 20 dBm for a wireless device associated with a root AP (or CAP), or below 45 dBm for a device associated with a SAP, the wireless device receiving the monitored traffic flow may be marked for steering to another AP, another frequency band, or both. In some implementations, a wireless device may be marked, or simply chosen, for steering from one frequency band to another frequency band (i.e., from the 2.4 GHz band to the 5 GHz band) within the same serving AP if the SNR values to the non-associated frequency band (i.e., the 5 GHz band) are estimated to be greater than 30 dBm. Additionally, or alternatively, to the RSSI threshold value comparison, and the SNR threshold value comparison, the processor can compare transmission byte counts, receiving byte counts, MCS values, PER values, spatial stream values, and data rate values to threshold transmission byte counts values, threshold receiving byte counts values, threshold MCS values, threshold PER values, threshold spatial stream values, and threshold data rate values, respectively.

In response to determining that the RSSI values of the monitored traffic flow are above the RSSI threshold value (i.e., determination block 602="No"), the processor takes no further action, other than maintaining the monitoring of the traffic flow associated with the one or more wireless devices at block 601.

In response to determining that the RSSI values of the monitored traffic flow are below the RSSI threshold value (i.e., determination block 602="Yes"), the processor can be implemented to consider steering one or more wireless devices to another AP in the multi-AP environment. In other words, if the RSSI values of the monitored traffic flow associated with a wireless device do not meet the particular RSSI threshold value for the serving AP, the serving AP may mark the wireless device for steering to a neighboring AP, and particularly one where the wireless device's RSSI values may meet, or exceed, that neighboring AP's RSSI threshold value. In some multi-AP environment implementations, the serving AP can send a steering-related message to the neighboring AP, and also can send a steering request to the wireless device, where the steering request instructs the wireless device to join a basic service set (BSS) of the neighboring AP. In some other multi-AP environment implementations, such as SON implementations, the serving AP can send a steering request to the wireless device, and through a proprietary SON protocol, can inform the neighboring AP that is may expect the wireless device to join the neighboring AP's BSS, as well as the reason for why the wireless device is being marked for steering (i.e., low RSSI values, high SNR values, high PER values, a channel utilization exceeds a maximum medium utilization, etc.). After determining "Yes" at determination block 602, the processor can proceed to block 604.

At determination block 603, the AP may determine whether a channel utilization exceeds a maximum medium utilization on that channel. In some implementations, a processor of the AP, such as the processor 360, depicted and described in FIG. 3, may determine whether the channel utilization exceeds the maximum medium utilization on that channel. In some other implementations, the channel utilization determination may be made by the channel conditions and capacity estimation software module 333, depicted and described in FIG. 3. While in some implementations, the processor 360 or channel conditions and capacity estimation software module 333 may make determinations based on a single channel, in some other implementations, the determination is based on considering all the channels that are within the operating bandwidth to calculate the maximum medium utilization. In some implementations, the maximum medium utilization threshold is approximately 70% of both the 2.4 GHz and 5 GHz frequency bands, as the channel may be considered to be overloaded beyond this threshold value. However, a person having ordinary skill in the art will readily recognize that the maximum medium utilization value may be predetermined, configurable, or dynamically adjusted, depending on the particular implementation.

In response to determining that the channel utilization does not exceed the maximum medium utilization on that channel (i.e., determination block 603="No"), the processor takes no further action, other than maintaining the monitoring of the traffic flow associated with the one or more wireless devices at block 601.

In response to determining that the channel utilization does exceed the maximum medium utilization on that channel (i.e., determination block 603="Yes"), the processor can be implemented to consider steering one or more wireless devices to another AP in the multi-AP environment. In other words, if the channel utilization is associated with the monitored traffic flow is greater than the maximum medium utilization, the serving AP may mark the wireless device for steering to a neighboring AP, and particularly one where the maximum medium utilization will not be exceeded. After determining "Yes" at determination block 603, the processor can proceed to block 604.

At block 604, a steering ranking list can be generated. The steering ranking list, such as the steering ranking list 500, depicted and described in FIG. 5, can be generated by the AP, or the processor at the AP. In some implementations, the steering ranking list can be generated at block 604 if either of the two conditions (i.e., the RSSI value determination at block 602, or the channel utilization determination at block 603) is satisfied. In some implementations, the steering ranking list can be pre-generated, whereas in some other implementations, the steering ranking list can be dynamically generated. The steering ranking list can include one or more wireless device, or client, capability categories, such as the capability categories 420 or the capability categories 520, depicted and described in FIGS. 4 and 5, respectively, in relation to one or more wireless devices, such as the wireless devices 501-505, depicted and described in FIG. 5. The steering ranking list can include consolidated weights, such as the consolidated weights 550, depicted and described in FIG. 5, and device steering ranks, such as the device steering ranks 570, depicted and described in FIG. 5, for each of the one or more wireless devices.

In some implementations, before the processor generates the steering ranking list at block 604, the processor can be configured to determine if the wireless device profile-based steering bit is enabled, or set.

At block 605, steering may be initiated, based on an order in the steering ranking list. The AP, or the processor at the AP, may initiate steering of one or more wireless devices in a multi-AP environment, based on the order of the wireless devices in the steering ranking list. The order of the wireless devices can be based on the device steering ranks. In some implementations, the AP/band steering software module 336, depicted and described in FIG. 3, can initiate the steering of the one or more wireless devices based on the ranked order appearing in the steering ranking list. For example, the wireless device having the highest device steering ranking can be the first wireless device attempted to be steered from a first AP to a second AP, or from a first frequency band on the first AP to a second frequency band on the first AP. As a corollary, the wireless device having the second highest device steering ranking can be the second wireless device attempted to be steered to a different wireless association in the multi-AP environment, and so on.

At block 606, the steering ranking list may be updated. In some implementations, the steering ranking list may be updated after each steering attempt. The AP, or the processor at the AP, may update the steering ranking list after each attempt to selectively steer at least one wireless device to a different wireless association in a multi-AP environment. In some implementations, the AP/band steering software module 336, depicted and described in FIG. 3, can update the steering ranking list. In some implementations, after an attempt to steer a wireless device has occurred, the weights assigned for each of the wireless device's capability categories may be reevaluated, redetermined or recalculated, and as a result, updated consolidated weights may be provided. Updated device steering ranks can be determined based on the updated consolidated weights. After updating the steering ranking list, the AP, or the APs, may continue monitoring the traffic flow, or may resume monitoring the traffic flow at block 601.

FIG. 7 shows an example method 700 of steering one or more wireless devices in a multi-AP environment. In some implementations, the multi-AP environment is part of a self-organizing network (SON). The operations of the method 700 may be implemented by the root AP 110, depicted and described in FIGS. 1A and 1B, or its components described throughout. The operations of the method 700 also may be implemented by one or more of the APs 111-116, depicted and described in FIGS. 1A and 1B, or their components as described throughout. Additionally, the operations of the method 700 may be implemented by the AP 300, depicted and described in FIG. 3, or its components described throughout. In some implementations, the root AP 110, the APs 111-116, or the AP 300, may execute a set of instructions or codes to control the functional elements of the respective device, or of one or more other devices, to perform the functions described in FIG. 7. Additionally, or alternatively, the root AP 110, the APs 111-116, or the AP 300, may perform aspects of the functions described in FIG. 7 using special-purpose hardware.

At block 710, a traffic flow associated with one or more wireless devices may be monitored. One or more APs, such as the AP 110, the APs 111-116, or the AP 300, may be implemented to monitor the traffic flow associated with one or more wireless devices. The one or more wireless devices may include one or more of the stations STA1-STA4, depicted and described with respect to FIGS. 1A and 1B, the station STA 200, depicted and described with respect to FIG. 2, or the wireless devices 501-505, depicted and described with respect to FIG. 5. By monitoring the traffic flow, the one or more APs can obtain information related to: RSSI values, channel utilization metrics, SNR values, transmission byte counts, receiving byte counts, MCS values, PER values, spatial stream values, data rate values, HT operation, VHT operation, extremely high throughput (EHT) operation, and traffic type (including traffic classifications by the various ACs described throughout).

At block 720, at least one of the one or more wireless devices may be determined to be steered. The determination to steer at least one of the one or more wireless devices may be based, at least in part, on the monitored traffic flow. The steering determination may be made by a processor operating at the root AP 110, at one or more of the APs 111-116, or at the AP 300. In some implementations, the steering determination may be made by the AP/band steering software module 336, depicted and described in FIG. 3. For example, if the monitored traffic flow associated with a wireless device indicates that the wireless device is not be served effectively, such as, the RSSI values of the monitored traffic flow are below a RSSI threshold value, or the amount of data requested on the channel exceeds a threshold data value, or the SNR values fall below a SNR threshold value, etc., the AP may determine that the wireless device will be better served with a different wireless association, and may mark the wireless device for steering. In some implementations, when such metrics of the monitored traffic flow for the wireless device are a defined percentage, such as 5%, or 10%, or 15%, or 20%, or 25%, or more, above or below a threshold traffic flow metric, the wireless device may be marked for steering to the different wireless association in the multi-AP environment.

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

At block 730, a steering ranking list of the one or more wireless devices may be generated. The steering ranking list may be generated based on a profile of each of the one or more wireless devices. The steering ranking list may be generated by a processor operating at the root AP 110, at one or more of the APs 111-116, or at the AP 300. In some implementations, at least portions of the steering ranking list may be predetermined, while in some other implementations, at least portions of the steering ranking list is generated dynamically.

The profile of each of the one or more wireless devices (also known as a wireless device profile) may be stored at the root AP, at one or more of the APs 111-116, or at the AP 300. In some implementations, the profile may be stored in the STA profile data store 331, depicted and described in FIG. 3. The profile of each of the one or more wireless devices may be predetermined, configurable, or dynamically adjusted. In some implementations, the profile of each of the one or more wireless devices (also known as a wireless device profile) may be generated by a processor operating at the root AP 110, at one or more of the APs 111-116, or at the AP 300.

In some implementations, the profile of each of the one or more wireless devices includes one or more of the following wireless device capabilities, or capability categories: a device type (such as make, model, year, etc.), a service-based classification (i.e., a mobile phone, a tablet, a laptop, an embedded client, an IOT client, a desktop, etc.), a Wi-Fi radio capability (such as 802.11a/b/g, 802.11n, 802.11ac, 802.11ax, 802.11be, etc.), a traffic type (i.e., the type of traffic the wireless device is engaged with, such as voice traffic, video traffic gaming traffic, livestreams, downloads, best effort, monitoring, background, bulk, etc.), a Wi-Fi access category (WMM AC) designation, a number of spatial stream supported, one or more operation modes (i.e., 802.11 designations, HT/VHT/EHT designations, or Wi-Fi 4/Wi-Fi 5/Wi-Fi 6/Wi-Fi 7 designations, etc.), MCS transmission rates, data rates, MU-MIMO compatibility, OFDM/OFDMA compatibility, mobility designations (i.e., is the wireless device moving or stationary, etc.), a hop count of the serving AP from the root AP, a priority designation (i.e., a high priority client (such as a device associated with medical equipment, patient monitoring, emergency services, security or security systems, etc.), a medium priority client, a low priority client, etc.), and a steering success rate (i.e., the track record, or history, of successfully steering the particular wireless device).

In some implementations, the priority designation may indicate a level of criticality of the wireless device, or of the monitored traffic flow associated with the wireless device. The priority designation may indicate that the wireless device or traffic flow is critical (i.e., medical-related services, emergency-related services, security-related services, real-time critical traffic flows, etc.), standard (or typical), or non-critical (i.e., non-real time (or non-time) traffic flows, etc.). In some implementations, the priority designation may be statically set in the profile of the wireless device. For example, if the wireless device is a patient monitoring-related device, such as a Drager Patient Monitoring device or Infinity M300 Telemetry device by Cisco®, or another medical-related apparatus, etc., the wireless device profile may be preconfigured to indicate that it is a high priority, or critical device, so that the one or more APs take particular care to ensure this wireless device receives high quality data services.

In some implementations, generating the steering ranking list is based on assigning weights to the profile of each of the one or more wireless devices. Weights can be assigned to one or more capability categories, such as the capability categories 420 or the capability categories 520, depicted and described in FIGS. 4 and 5, respectively. The weights assigned to each of the capability categories in the wireless device profile can be tabulated and a consolidated weight can be determined in the profile of each of the one or more wireless devices.

In some implementations, before generating the steering ranking list, one or more of the APs can be configured to determine if a steering bit is enabled in the profile of each of the one or more wireless devices. For example, if the wireless device profile includes an enabled steering bit, that wireless device may be marked for steering according to the implementations described in this disclosure.

At block 740, at least one wireless device may be selectively steered to a different wireless association. The at least one wireless device may be selectively steered to the different wireless association based, at least in part, on the steering ranking list. The at least one wireless device may be selectively steered to the different wireless association by one or more APs, such as the root AP 110, the one or more APs 111-116, or the AP 300. In some implementations, a processor operating at the root AP 110, at one or more of the APs 111-116, or at the AP 300, may perform the selective steering. In some implementations, the AP/band steering software module 336, depicted and described in FIG. 3, may selectively steer one or more wireless devices to a new, or different wireless association.

In some implementations, selectively steering the at least one wireless device occurs based on an order of the steering ranking list. For example, a wireless device having the highest consolidated weight, such as the consolidated weights 550, depicted and described in FIG. 5, and therefore the highest device steering rank, such as the device steering ranks 570, depicted and described in FIG. 5, may be the first wireless device considered for steering, or selected for steering, or both. The wireless device having the next highest (or greatest) consolidated weight, and therefore the highest (or greatest) device steering rank, may be the next wireless device considered for steering, or selected for steering, or both, and so on.

In some implementations, the steering ranking list can be updated after each attempt to selectively steer the at least one wireless device to the different wireless association in the multi-AP environment. The different wireless association may refer to a different band of a first AP, or the serving AP, in which the at least one wireless device is associated with wirelessly. Or, the different wireless association may refer to a second AP, or another AP, different from the first AP. In some implementations, selectively steering the at least one wireless device to the second AP includes sending a steering message from the first AP to the second AP. In some implementations, the steering message informs the second AP that the steering request instructs the at least one wireless device to join the BSS of the second AP. Additionally, in some implementations, selectively steering the at least one wireless device to the second AP includes sending a steering request to the at least one wireless device, where the steering request instructs the at least one wireless device to join a BSS of the second AP.

While the example method 700 in FIG. 7 includes four discrete blocks, a person having ordinary skill in the art will readily recognize that other blocks can be inserted between the depicted blocks. Additionally, other blocks may be performed before or after certain depicted blocks.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends on the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray™ disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine-readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of steering one or more wireless devices in a multi-access point (AP) environment, comprising:
monitoring a traffic flow associated with the one or more wireless devices;
determining that at least one wireless device of the one or more wireless devices is to be steered, based at least in part, on the monitored traffic flow;
generating a steering ranking list of the one or more wireless devices based on a profile of each of the one or more wireless devices;
determining if a steering bit is enabled in the profile of the at least one wireless device of the one or more wireless devices; and
selectively steering the at least one wireless device to a different wireless association in the multi-AP environment based, at least in part, on the steering ranking list.

2. The method of claim 1, wherein the selectively steering the at least one wireless device occurs based on an order of the steering ranking list.

3. The method of claim 1, wherein generating the steering ranking list is based on assigning weights to the profile of each of the one or more wireless devices.

4. The method of claim 3, wherein the profile of each of the one or more wireless devices includes at least one member of the group consisting of:
a Wi-Fi multimedia (WMM) access category (AC) designation;
a number of spatial streams supported;
a high throughput (HT) operation mode;
a Wi-Fi radio capability;
a modulation and coding scheme (MCS) transmission rate;
a data rate of the monitored traffic flow;
a multi-user (MU)-multiple input and multiple output (MIMO) compatibility;
an orthogonal frequency-division multiplexing (OFDM)/orthogonal frequency-division multiple access (OFDMA) compatibility; a mobility designation;
a hop count of a connected AP to a root AP;
a service-based classification;
a priority designation; and
a steering success rate.

5. The method of claim 4, wherein the priority designation indicates a level of criticality.

6. The method of claim 4, wherein the priority designation is statically set in the profile.

7. The method of claim 4, wherein the steering success rate is based on historical attempts to steer each of the one or more wireless devices.

8. The method of claim 1, further comprising:
updating the steering ranking list after each attempt to selectively steer the at least one wireless device to the different wireless association in the multi-AP environment.

9. A method of steering one or more wireless devices in a multi-access point (AP) environment, comprising:
monitoring a traffic flow associated with the one or more wireless devices;
determining that at least one wireless device of the one or more wireless devices is to be steered, based at least in part, on the monitored traffic flow;
generating a steering ranking list of the one or more wireless devices based on a profile of each of the one or more wireless devices; and
selectively steering the at least one wireless device to a different wireless association in the multi-AP environment based, at least in part, on the steering ranking list;
wherein the different wireless association in the multi-AP environment includes:
a different band of a first AP in which the at least one wireless device is associated with wirelessly; or
a second AP; and
wherein selectively steering the at least one wireless device to the second AP comprises:
sending a steering message from the first AP to the second AP; and
sending a steering request to the at least one wireless device, wherein the steering request instructs the at least one wireless device to join a basic service set (BSS) of the second AP.

10. The method of claim 9, wherein the steering message informs the second AP that the steering request instructs the at least one wireless device to join the BSS of the second AP.

11. The method of claim 1, wherein the multi-AP environment is a self-organizing network (SON).

12. The method of claim 1, wherein the steering ranking list is generated dynamically.

13. An apparatus of an access point (AP) for steering one or more wireless devices in a multi-access point (AP) environment, comprising:
a first interface configured to obtain one or more packets from the one or more wireless devices; and
a processing system configured to:
monitor a traffic flow associated with the one or more packets;
determine that at least one wireless device of the one or more wireless devices is to be steered, based at least in part, on the monitored traffic flow;
generate a steering ranking list of the one or more wireless devices based on a profile of each of the one or more wireless devices;
determine if a steering bit is enabled in the profile of the at least one wireless device of the one or more wireless devices; and
selectively steer the at least one wireless device to a different wireless association in the multi-AP environment based, at least in part, on the steering ranking list.

14. The apparatus of claim 13, wherein the selectively steering the at least one wireless device occurs based on an order of the steering ranking list.

15. The apparatus of claim 13, wherein the generating the steering ranking list is based on assigning weights to the profile of each of the one or more wireless devices.

16. The apparatus of claim 15, wherein the profile of each of the one or more wireless devices includes at least one member of the group consisting of:
a Wi-Fi multimedia (WMM) access category (AC) designation;
a number of spatial streams supported;
a high throughput (HT) operation mode;
a Wi-Fi radio capability;
a modulation and coding scheme (MCS) transmission rate;
a data rate of the monitored traffic flow;
a multi-user (MU)-multiple input and multiple output (MIMO) compatibility;
an orthogonal frequency-division multiplexing (OFDM)/orthogonal frequency-division multiple access (OFDMA) compatibility;
a mobility designation;
a hop count of a connected AP to a root AP;
a service-based classification;
a priority designation; and
a steering success rate.

17. The apparatus of claim 16, wherein the priority designation indicates a level of criticality.

18. The apparatus of claim 16, wherein the steering success rate is based on one or more historical attempts to steer each of the one or more wireless devices in the multi-AP environment.

19. The apparatus of claim 13, wherein the processing system is further configured to:
update the steering ranking list after each attempt to selectively steer the at least one wireless device to the different wireless association in the multi-AP environment.

20. A non-transitory computer-readable medium comprising processor-executable program code configured to cause a processor of an access point (AP), operating within a multi-AP environment, to:
monitor a traffic flow associated with one or more wireless devices;
determine that at least one wireless device of the one or more wireless devices is to be steered, based at least in part, on the monitored traffic flow;
generate a steering ranking list of the one or more wireless devices based on a profile of each of the one or more wireless devices;
determine if a steering bit is enabled in the profile of the at least one wireless device of the one or more wireless devices; and
selectively steer the at least one wireless device to a different wireless association in the multi-AP environment based, at least in part, on the steering ranking list.

21. The non-transitory computer-readable medium of claim 20, wherein the selectively steering the at least one wireless device occurs based on an order of the steering ranking list.

22. The non-transitory computer-readable medium of claim 20, wherein the different wireless association in the multi-AP environment includes:
a different band of the AP; or
another AP.

23. The non-transitory computer-readable medium of claim 22, wherein selectively steering the at least one wireless device to the another AP comprises:
sending a steering message from the AP to the another AP; and
sending a steering request to the at least one wireless device, wherein the steering request instructs the at least one wireless device to join a basic service set (BSS) of the another AP.

24. An apparatus of an access point (AP) in a multi-AP environment, comprising:
means for monitoring a traffic flow associated with one or more wireless devices;
means for determining that at least one wireless device of the one or more wireless devices is to be steered, based at least in part, on the monitored traffic flow;
means for generating a steering ranking list of the one or more wireless devices based on a profile of each of the one or more wireless devices;
means for determining if a steering bit is enabled in the profile of the at least one wireless device of the one or more wireless devices; and
means for selectively steering the at least one wireless device to a different wireless association in the multi-AP environment based, at least in part, on the steering ranking list.

25. The apparatus of claim 24, wherein generating the steering ranking list is based on assigning weights to the profile of each of the one or more wireless devices.

26. The apparatus of claim 25, wherein the profile of each of the one or more wireless devices includes at least one member of the group consisting of:
a Wi-Fi multimedia (WMM) access category (AC) designation;
a number of spatial streams supported;
a high throughput (HT) operation mode;
a Wi-Fi radio capability;
a modulation and coding scheme (MCS) transmission rate;
a data rate of the monitored traffic flow;

a multi-user (MU)-multiple input and multiple output (MIMO) compatibility;

an orthogonal frequency-division multiplexing (OFDM)/orthogonal frequency-division multiple access (OFDMA) compatibility;

a mobility designation;

a hop count of a connected AP to a root AP;

a service-based classification;

a priority designation; and a steering success rate.

27. The apparatus of claim 26, wherein the priority designation is statically set in the profile.

28. The apparatus of claim 24, further comprising:

means for updating the steering ranking list after each attempt to selectively steer the at least one wireless device to the different wireless association in the multi-AP environment.

29. The apparatus of claim 24, wherein selectively steering the at least one wireless device to the different wireless association comprises:

sending a steering message from the AP to another AP; and sending a steering request to the at least one wireless device, wherein the steering request instructs the at least one wireless device to join a basic service set (BSS) of the another AP.

30. An access point (AP) for steering one or more wireless devices in a multi-access point (AP) environment, comprising:

a first interface configured to obtain one or more packets from the one or more wireless devices; and a processing system configured to:

monitor a traffic flow associated with the one or more packets;

determine that at least one wireless device of the one or more wireless devices is to be steered, based at least in part, on the monitored traffic flow;

generate a steering ranking list of the one or more wireless devices based on a profile of each of the one or more wireless devices; and selectively steer the at least one wireless device to a different wireless association in the multi-AP environment based, at least in part, on the steering ranking list wherein the different wireless association in the multi-AP environment includes:

a different band of the AP in which the at least one wireless device is associated with wirelessly; or a second AP; and wherein selectively steering the at least one wireless device to the second AP comprises:

sending a steering message from the AP to the second AP; and sending a steering request to the at least one wireless device, wherein the steering request instructs the at least one wireless device to join a basic service set (BSS) of the second AP.

\* \* \* \* \*